Figure 20:
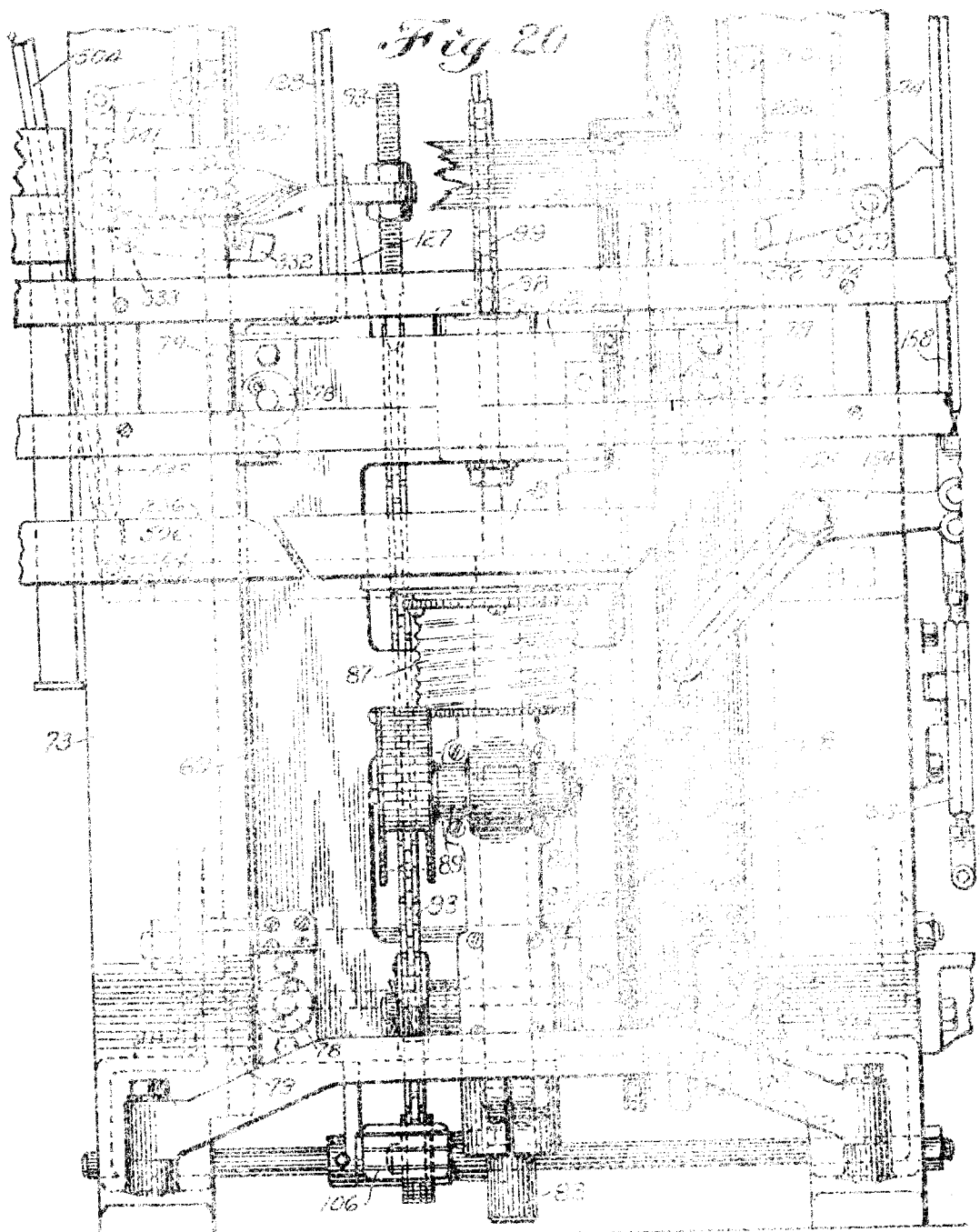

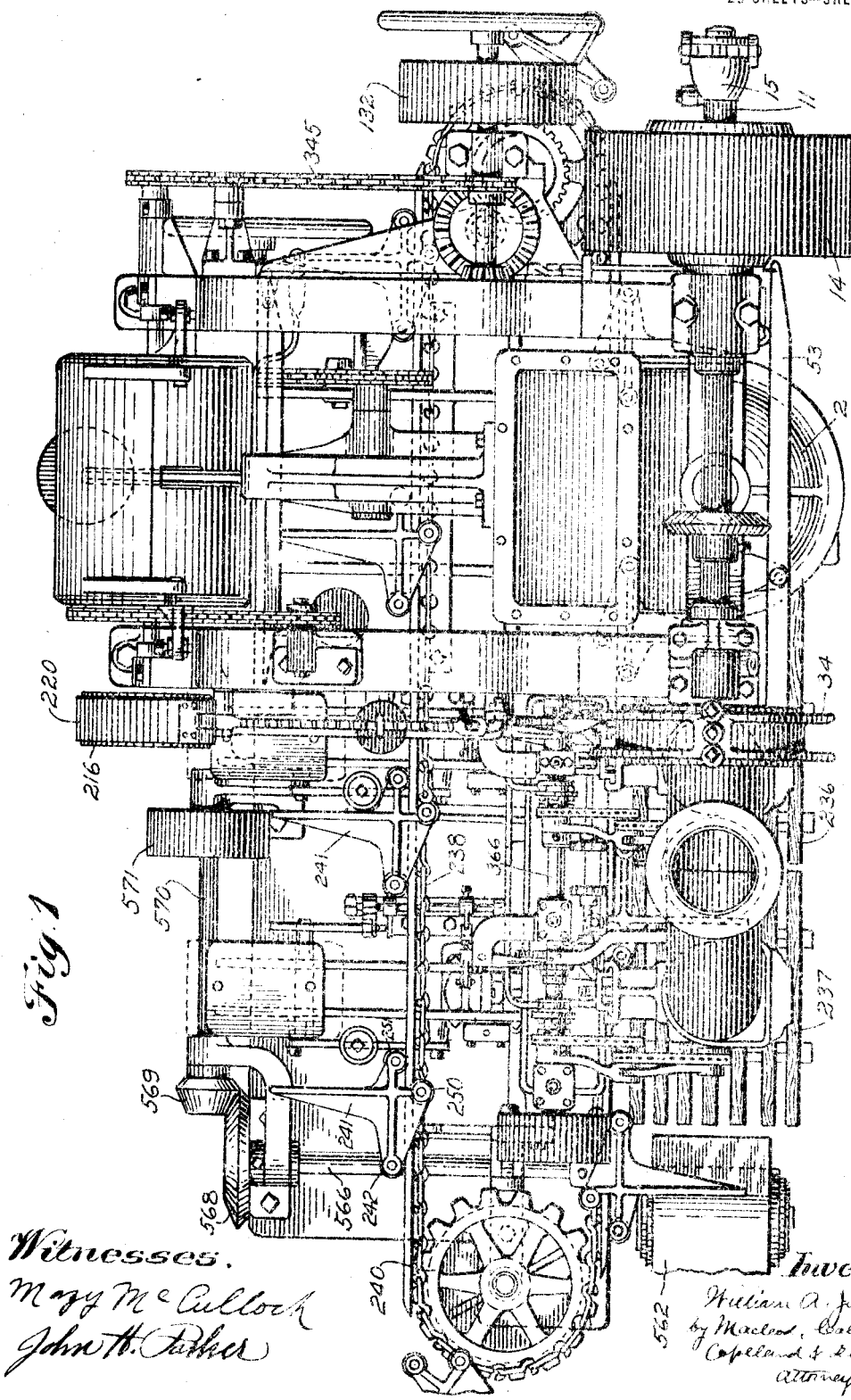

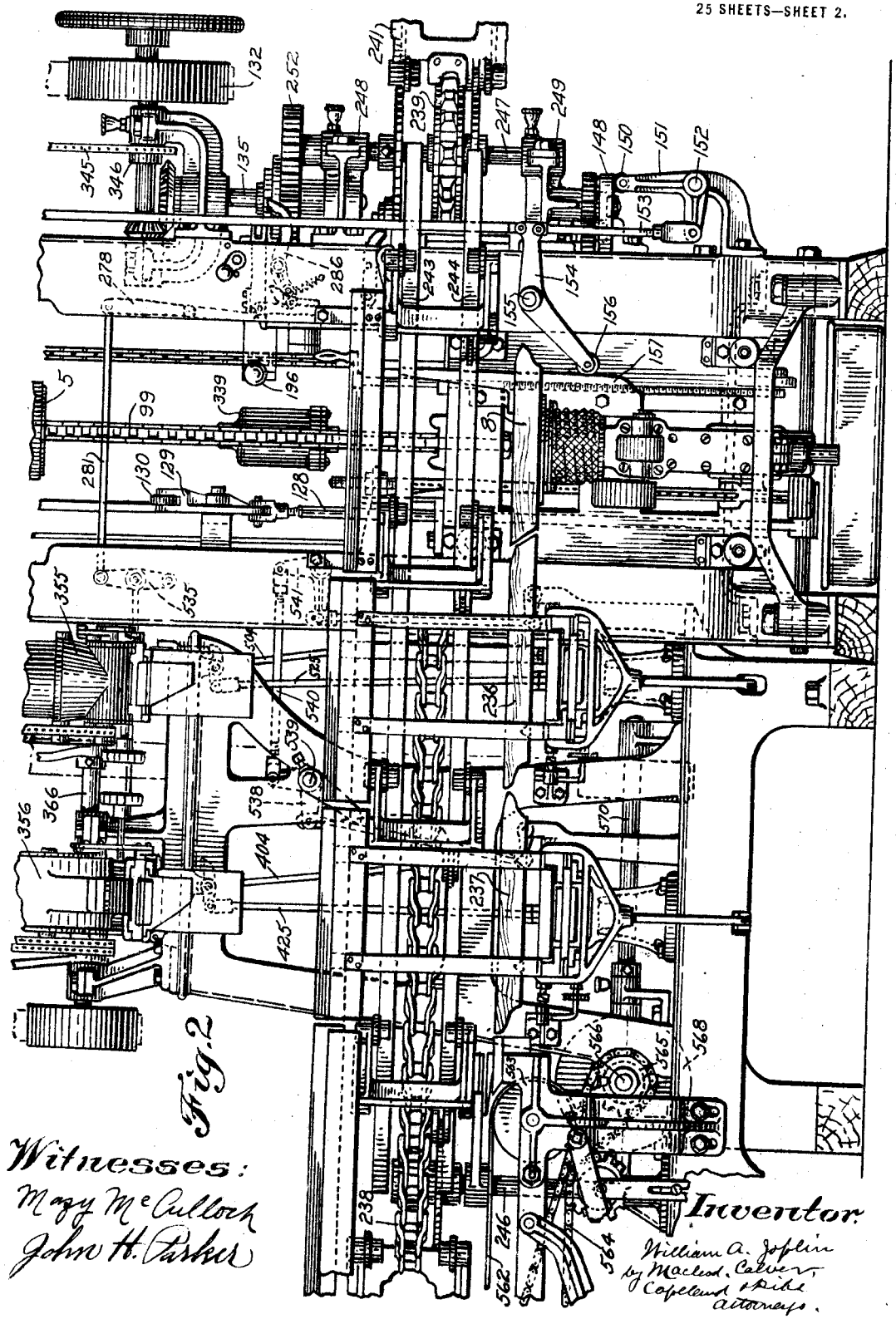

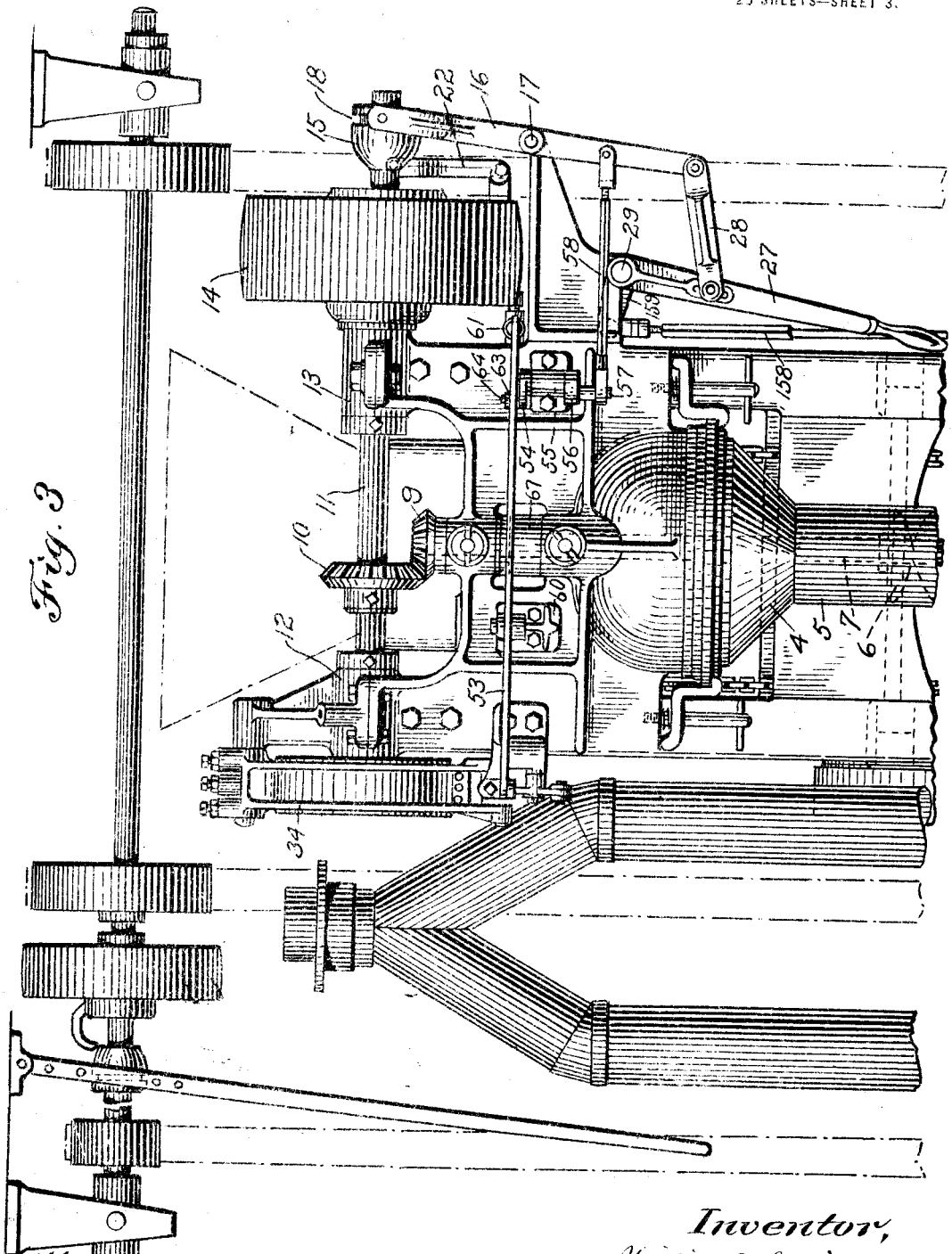

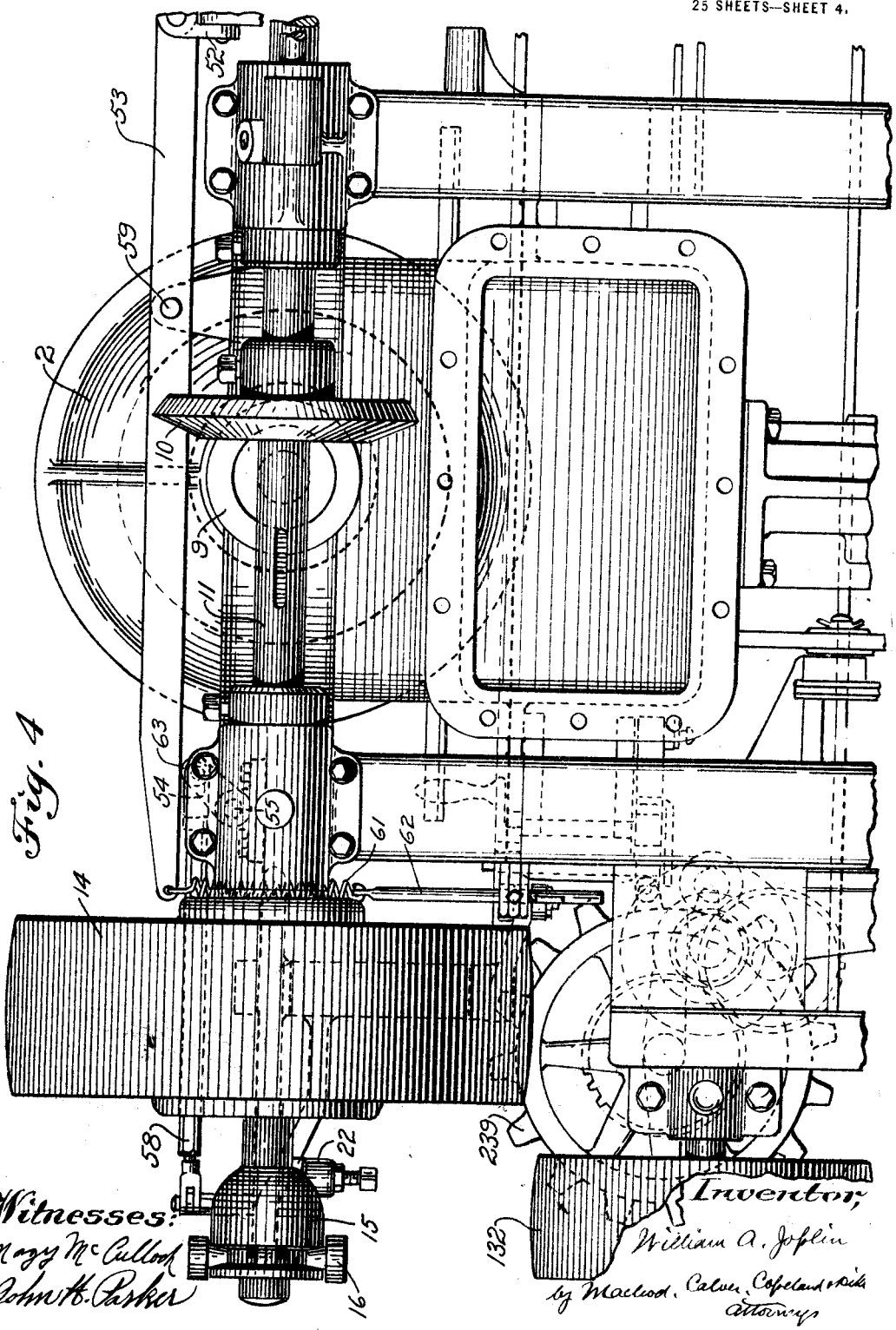

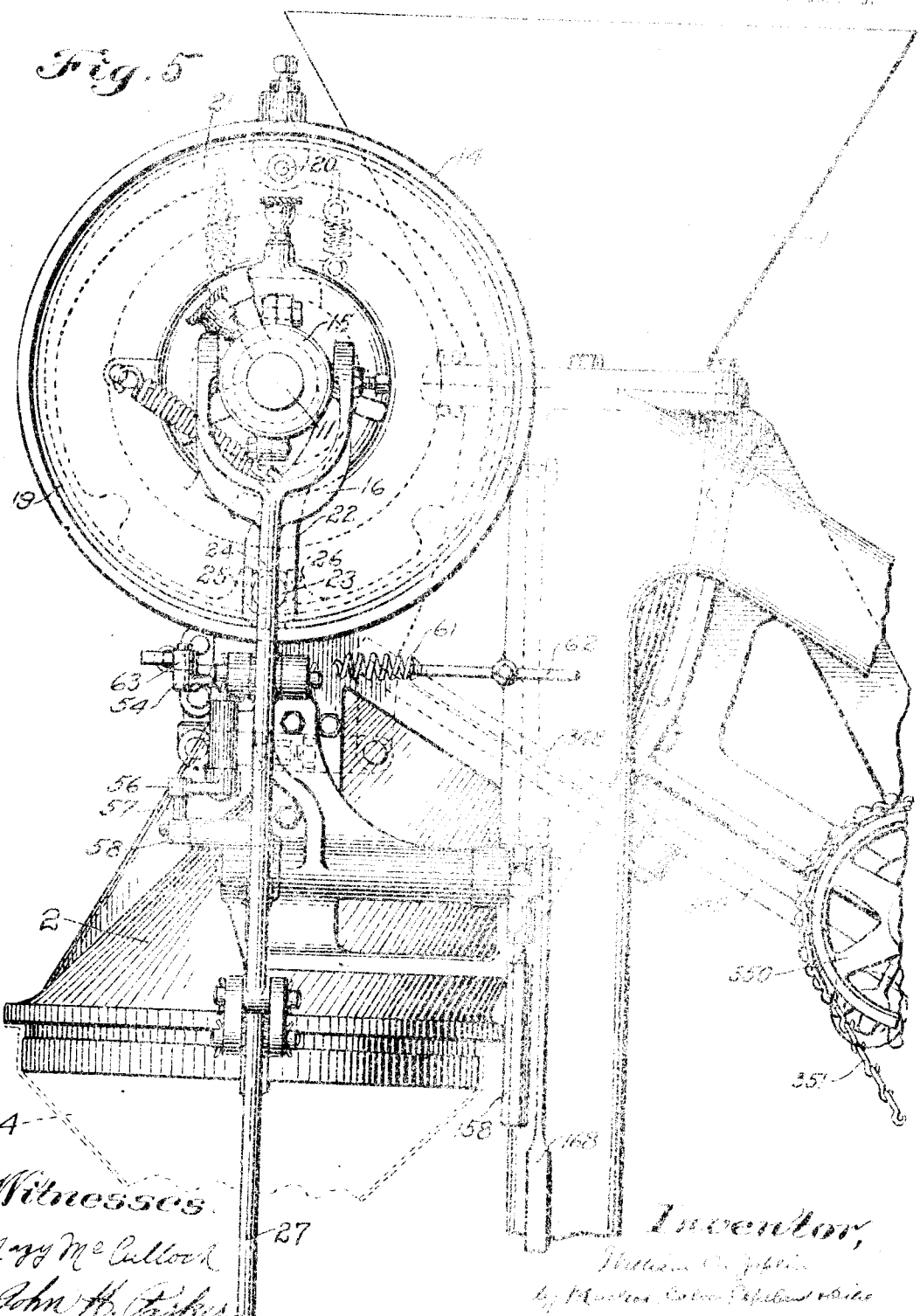

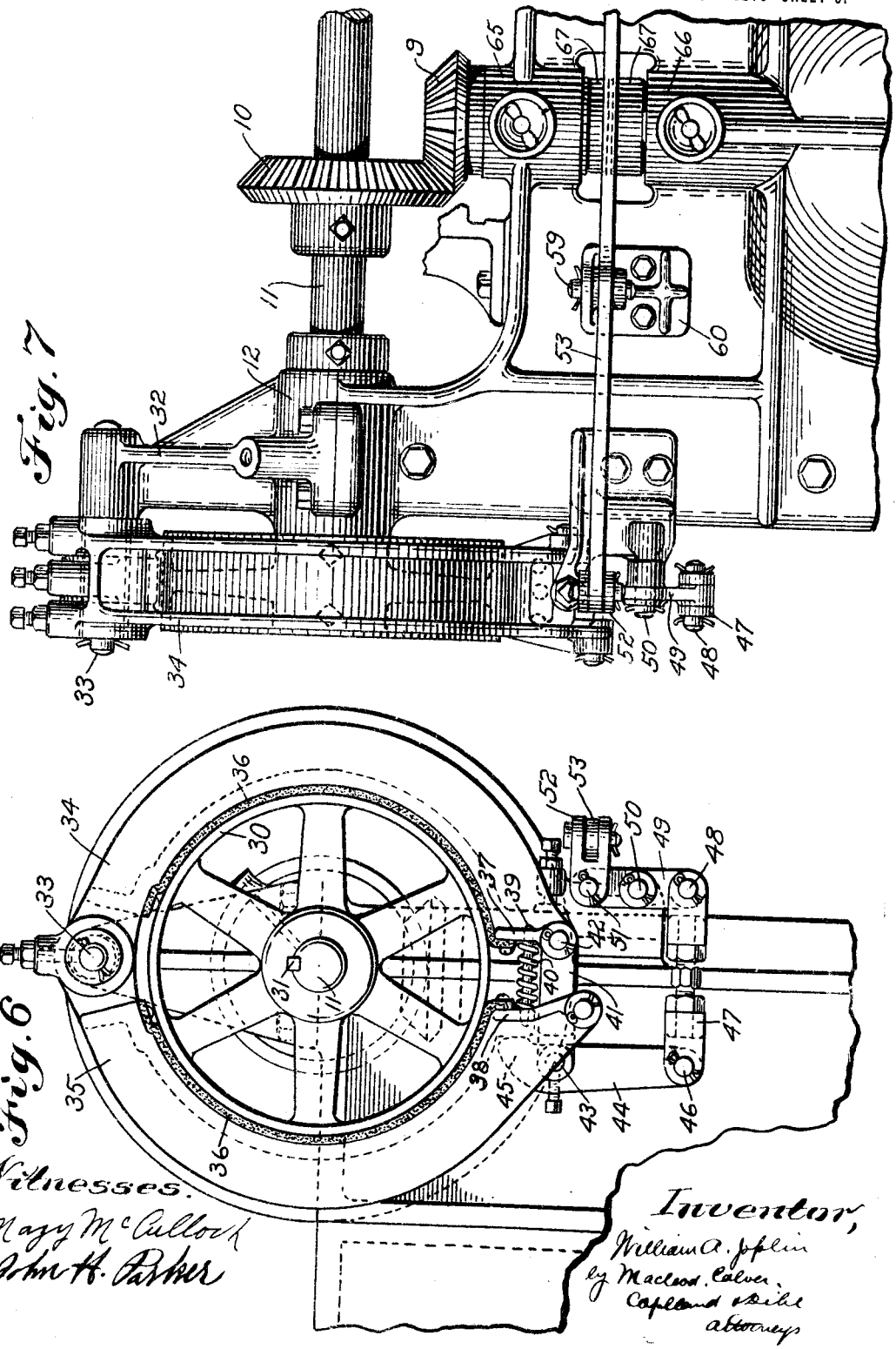

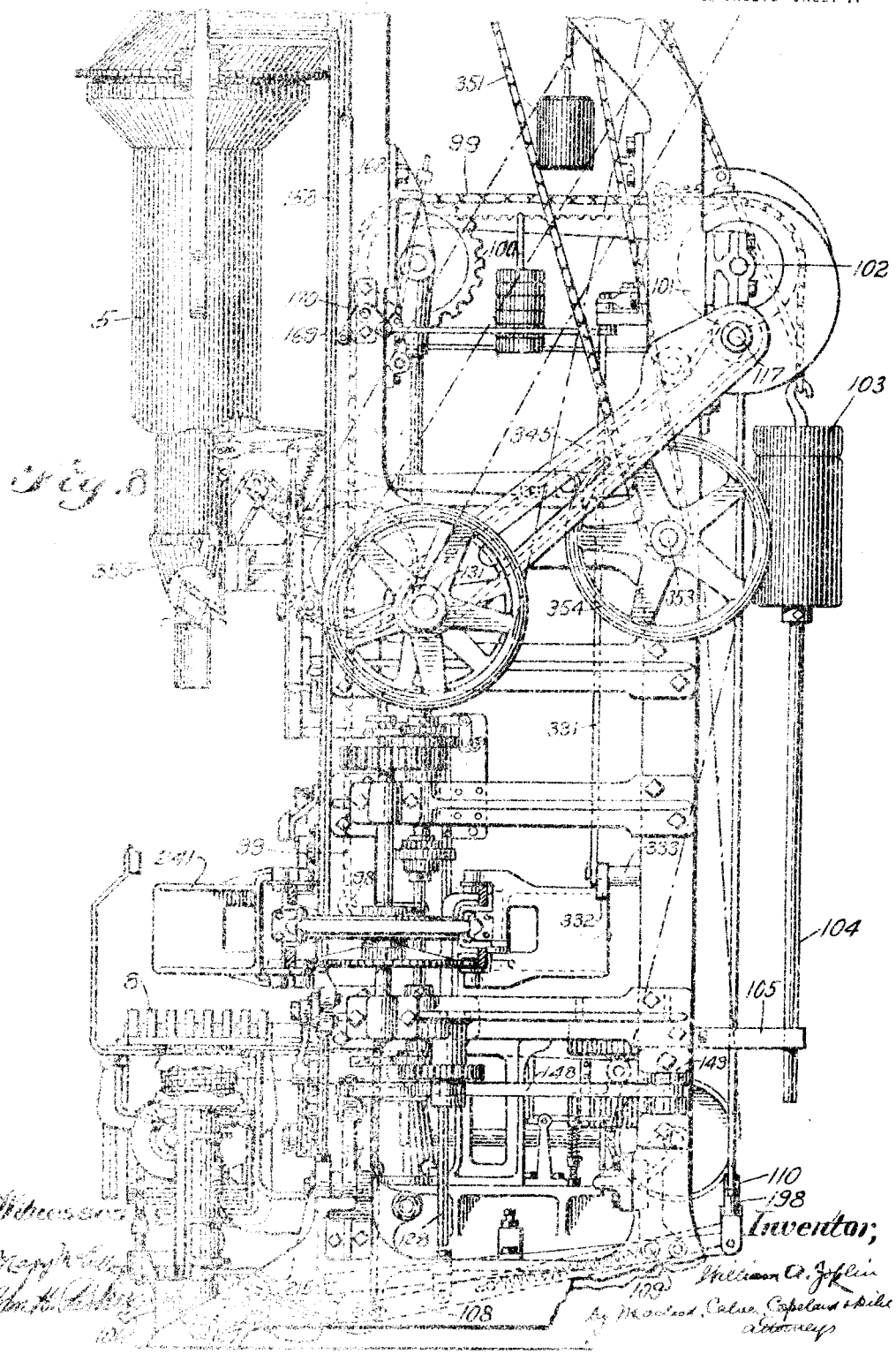

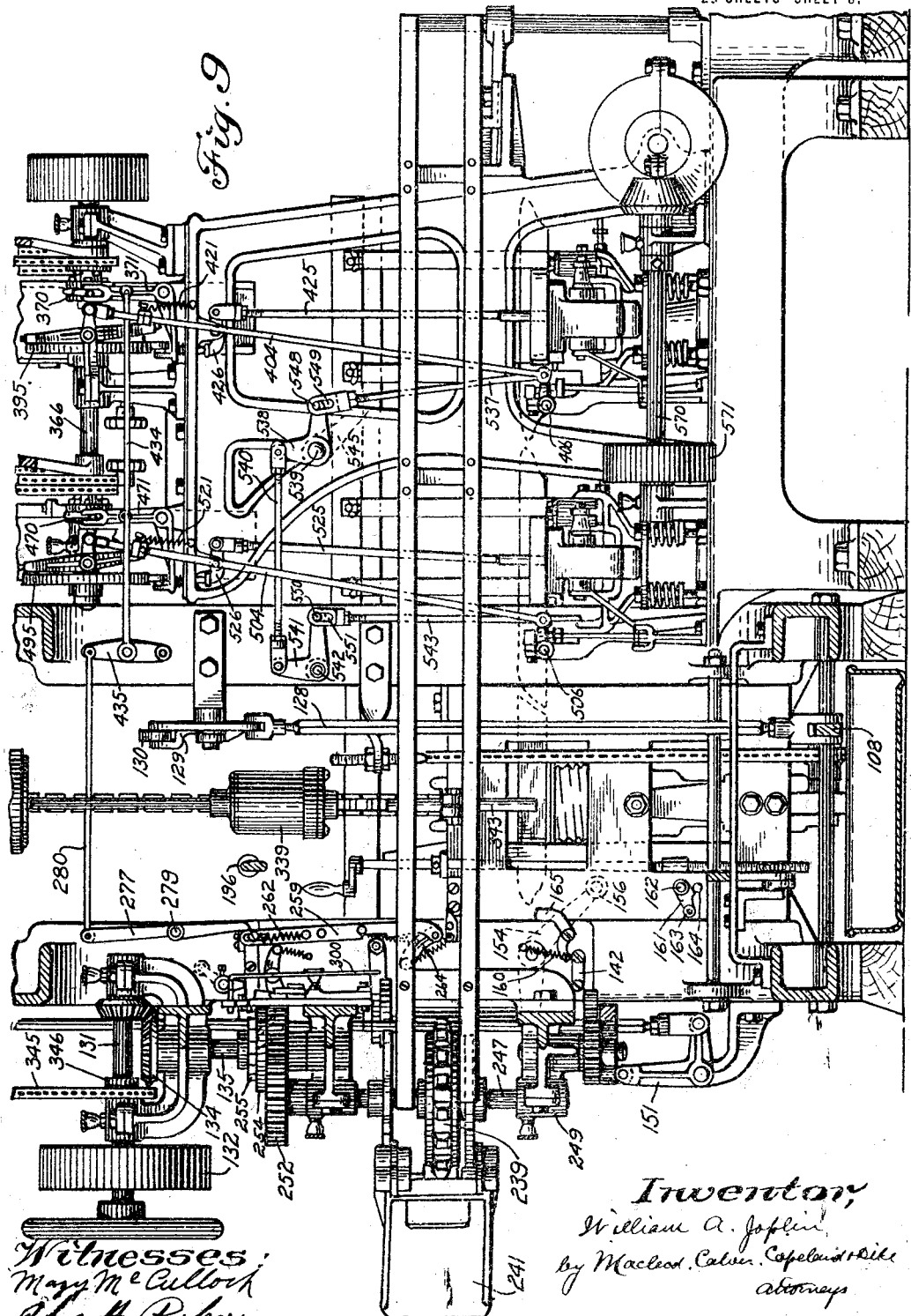

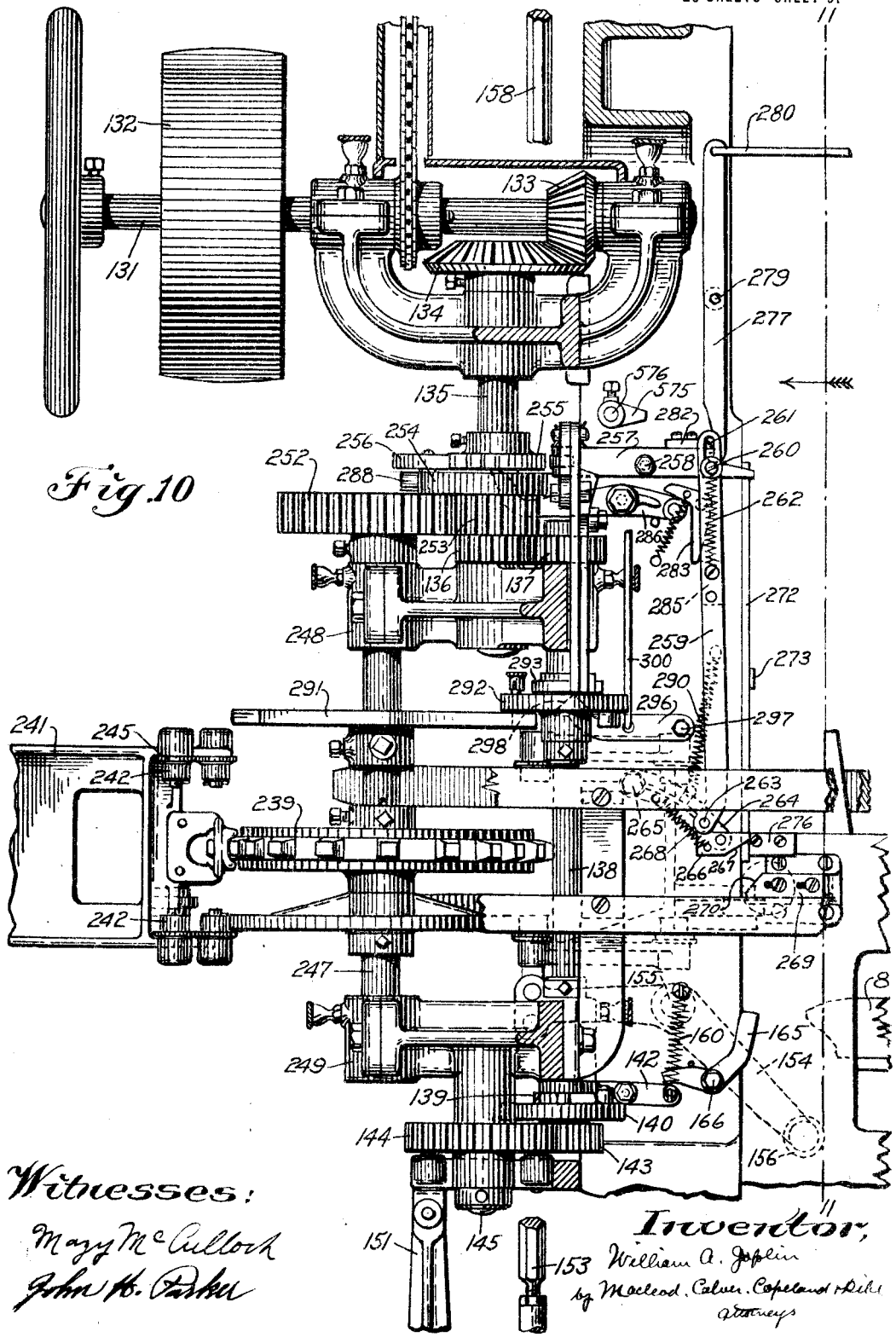

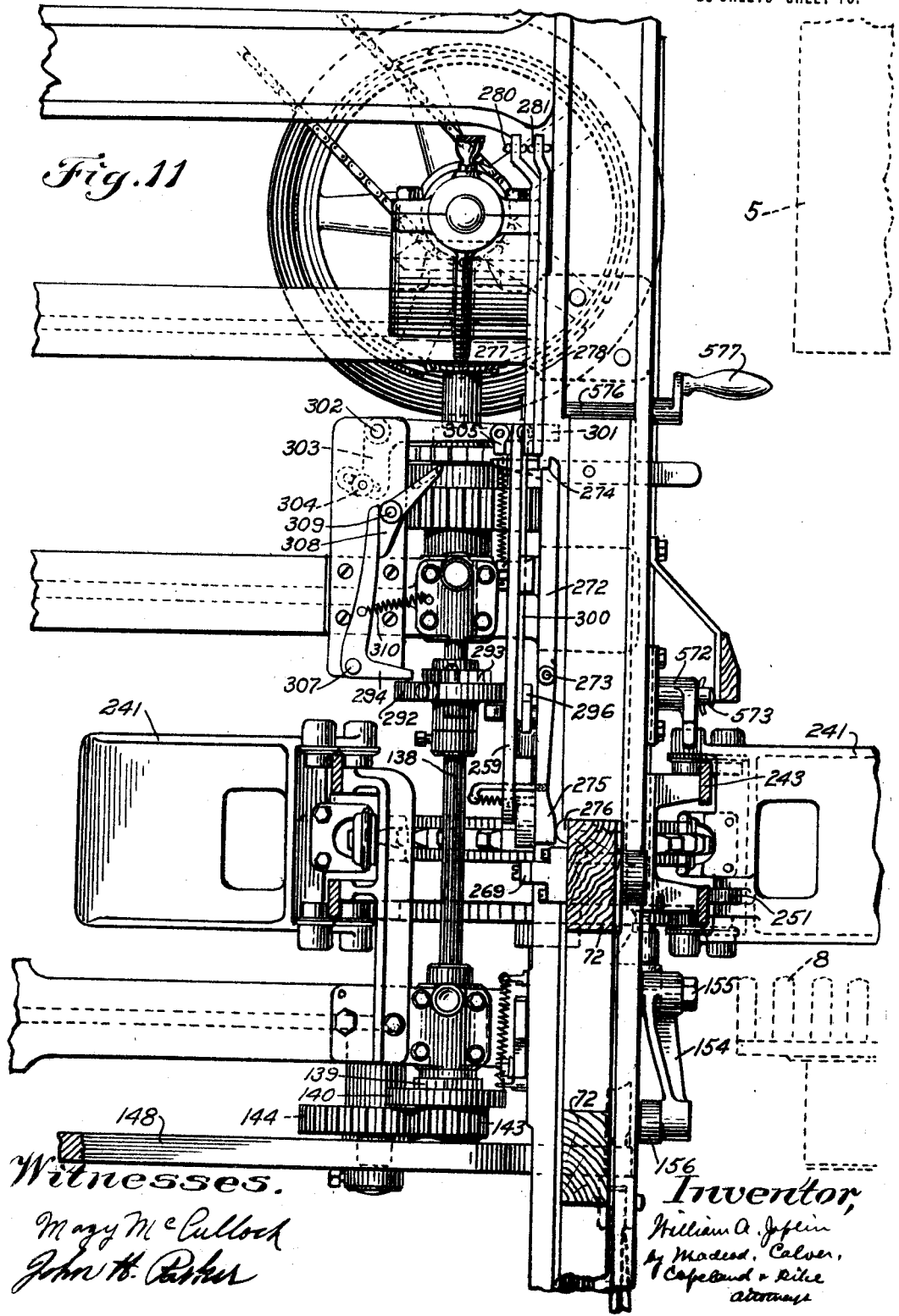

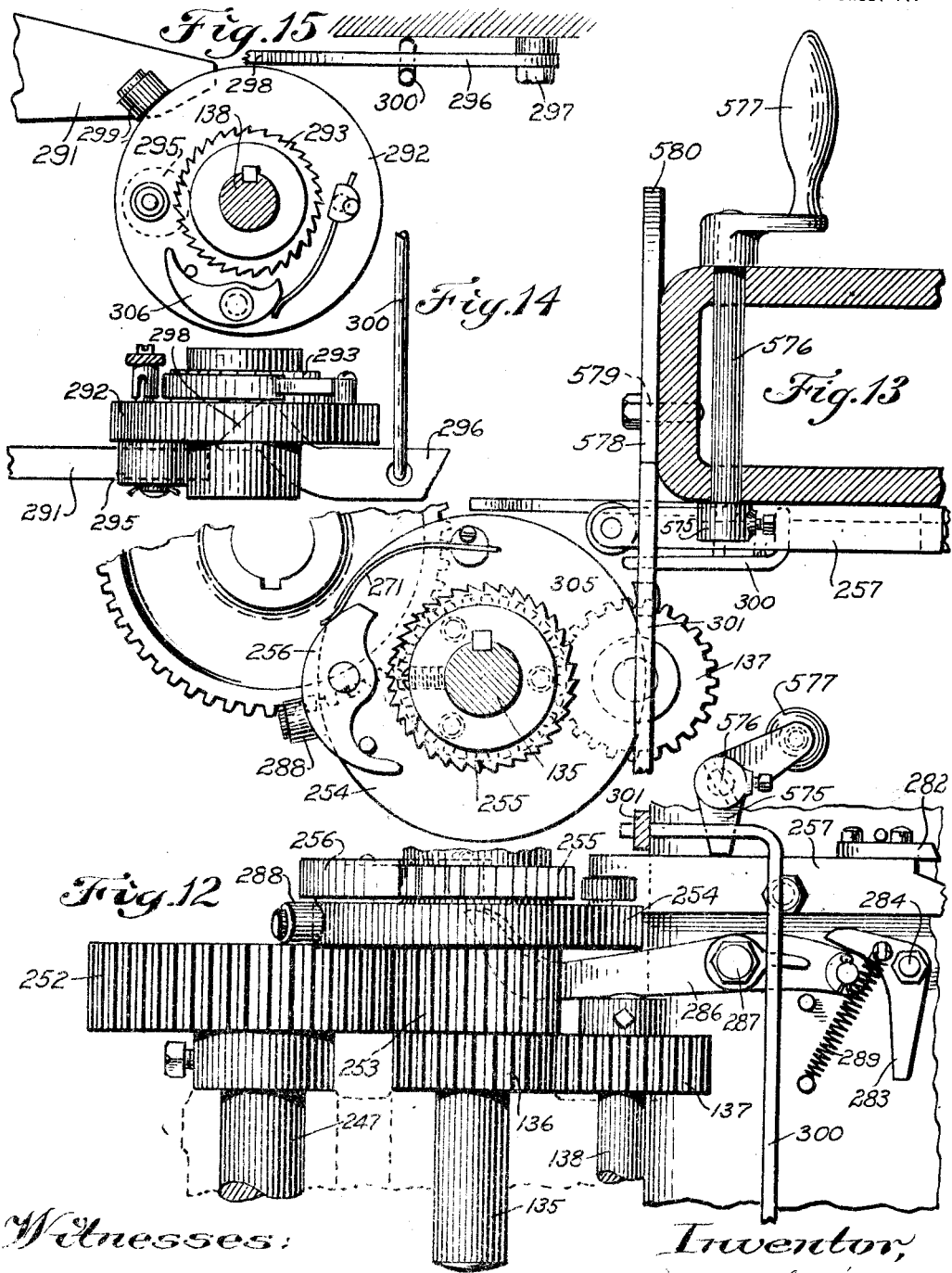

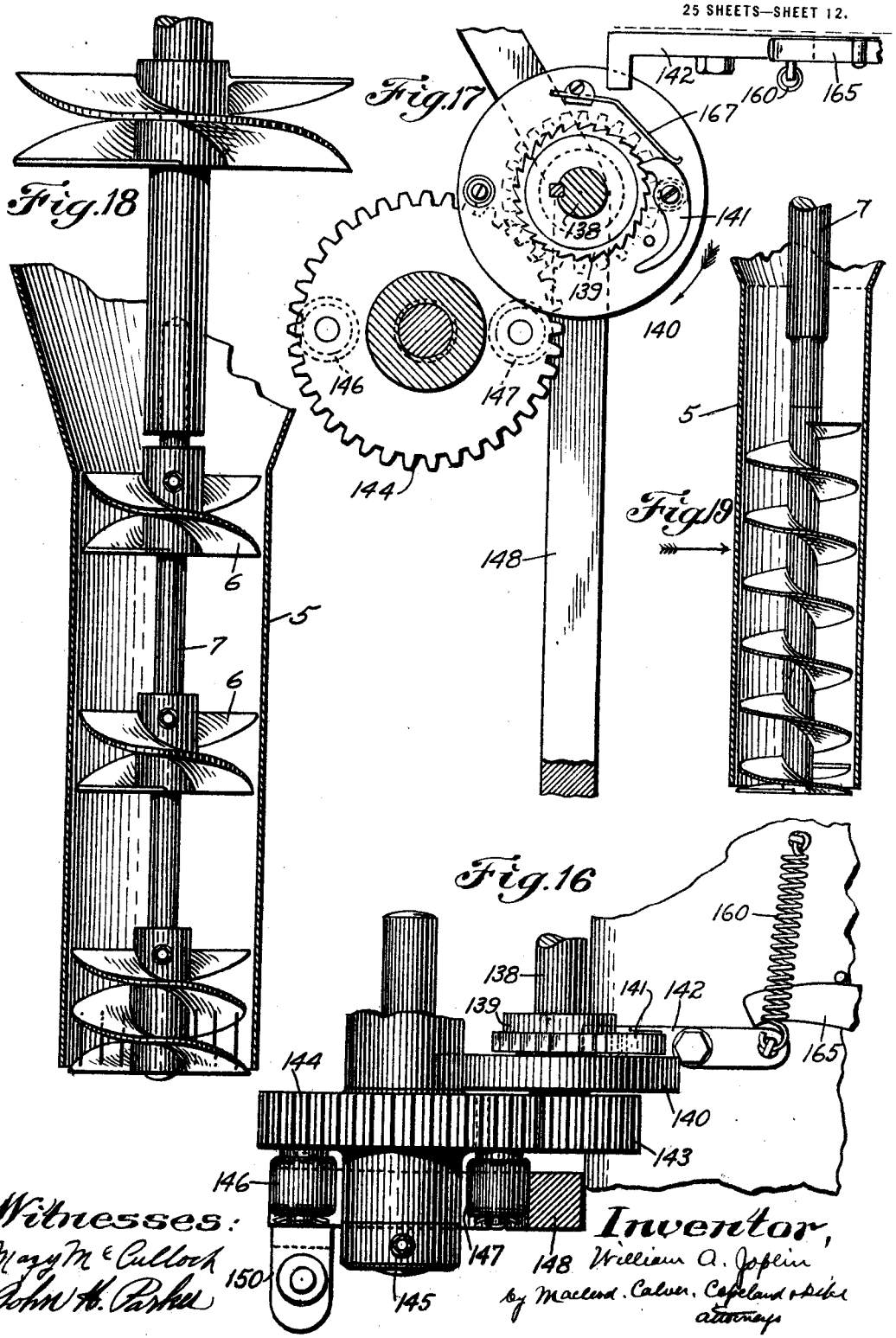

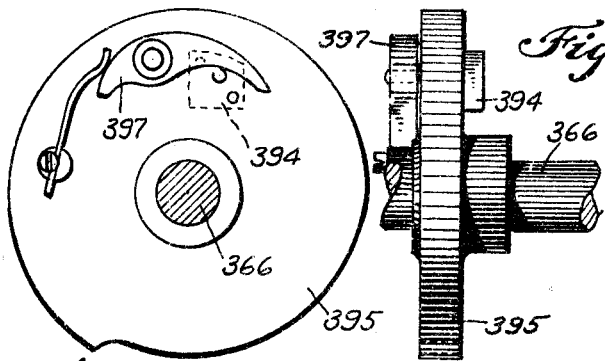
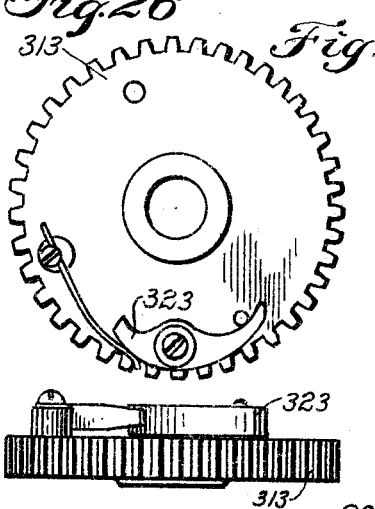
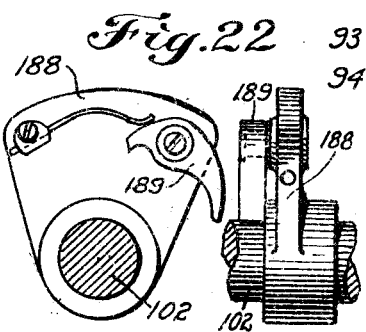
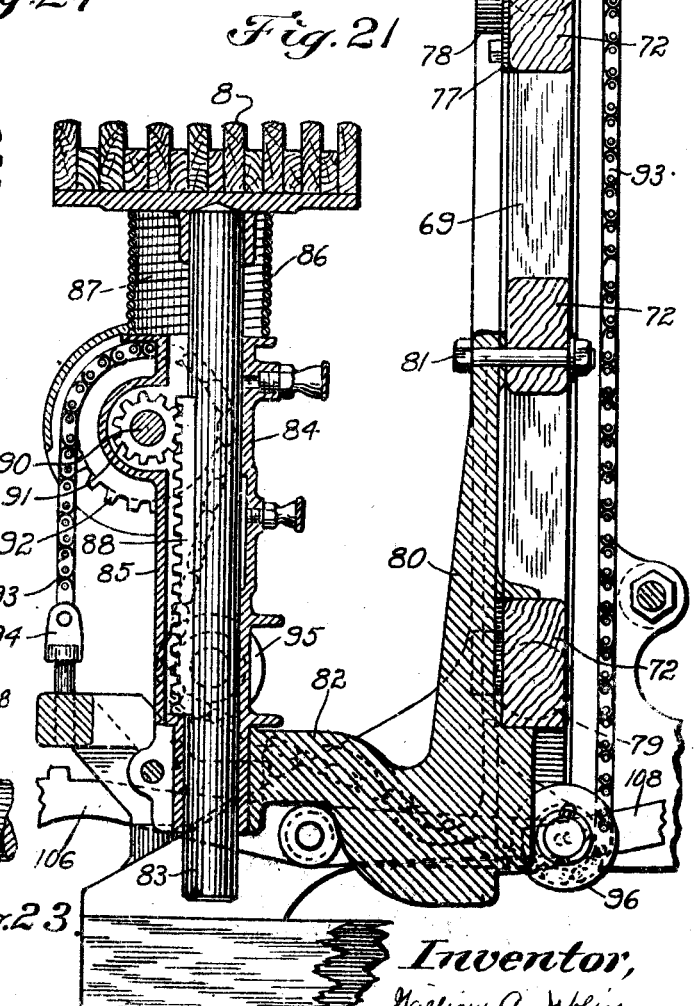

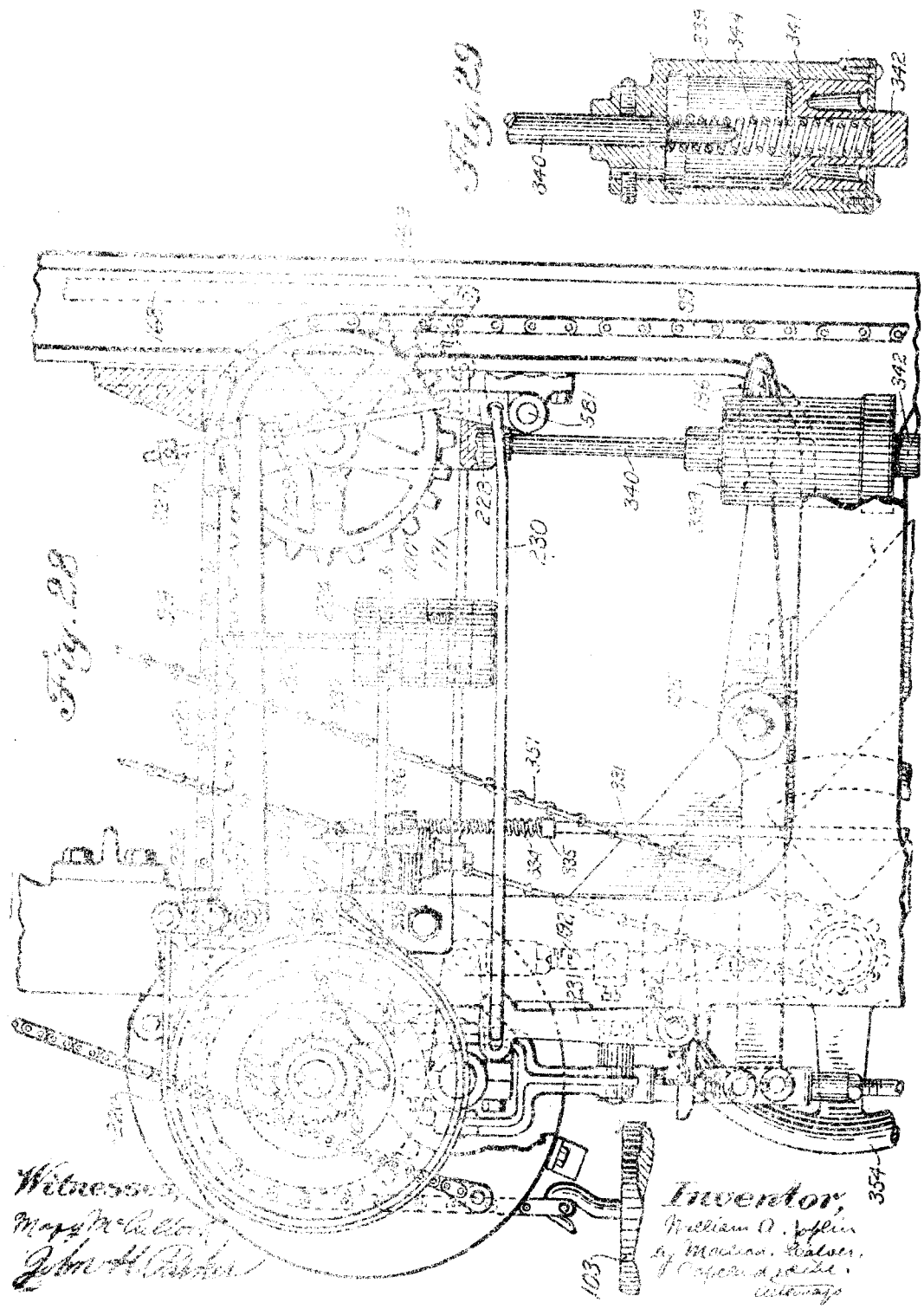

W. A. JOPLIN.
BAG FILLING MACHINE.
APPLICATION FILED JULY 9, 1915.
1,199,561.
Patented Sept. 26, 1916.
25 SHEETS—SHEET 16.
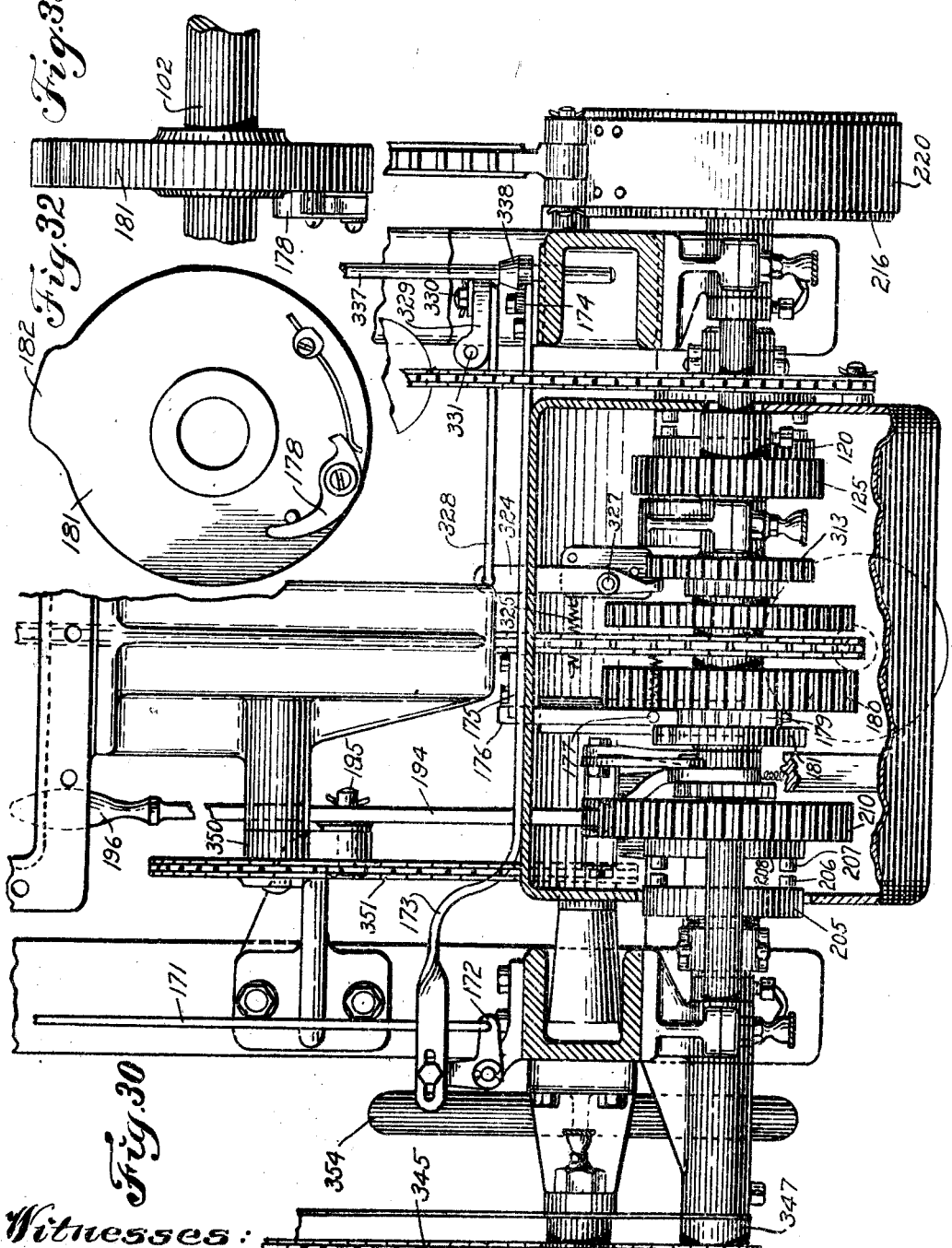

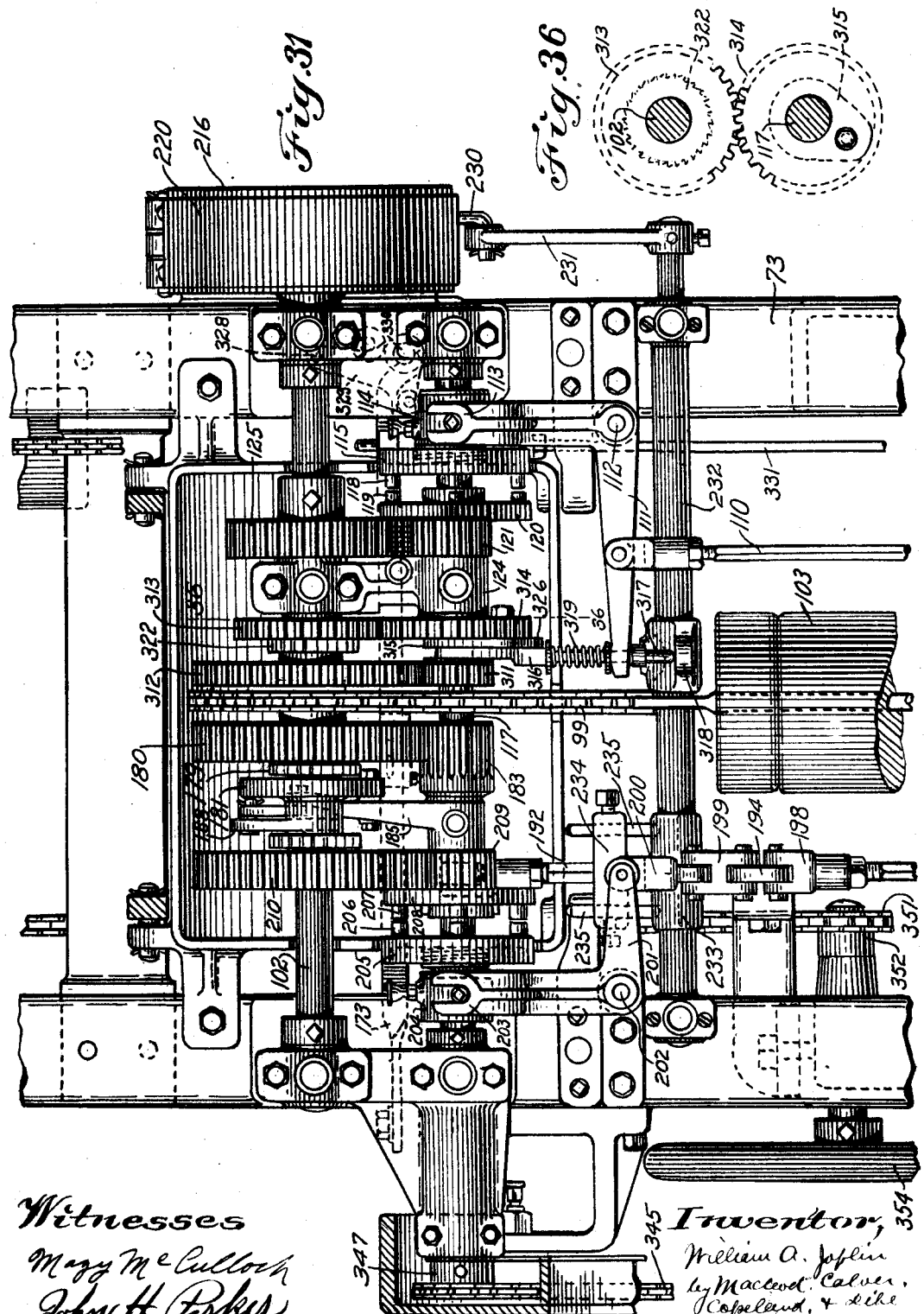

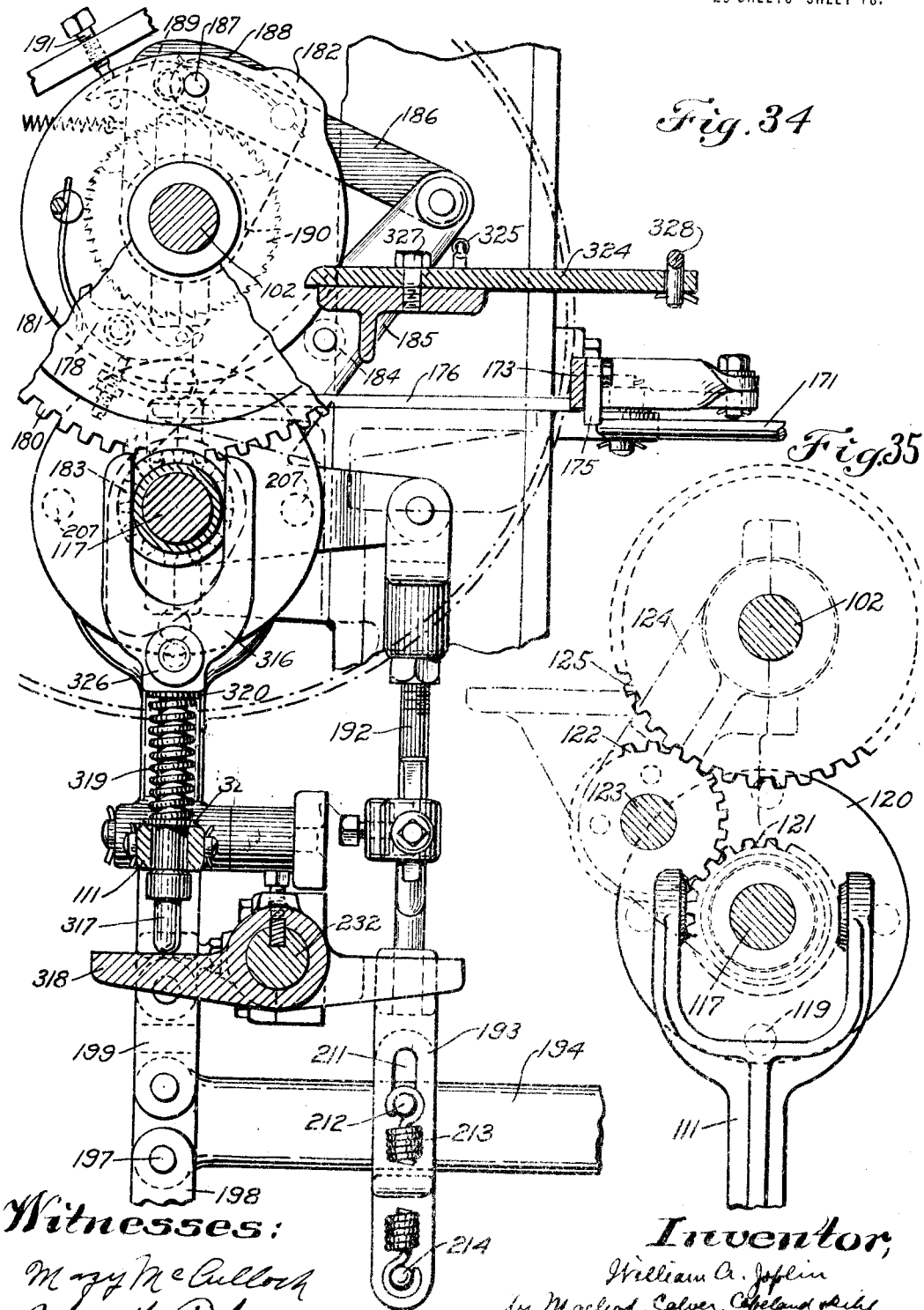

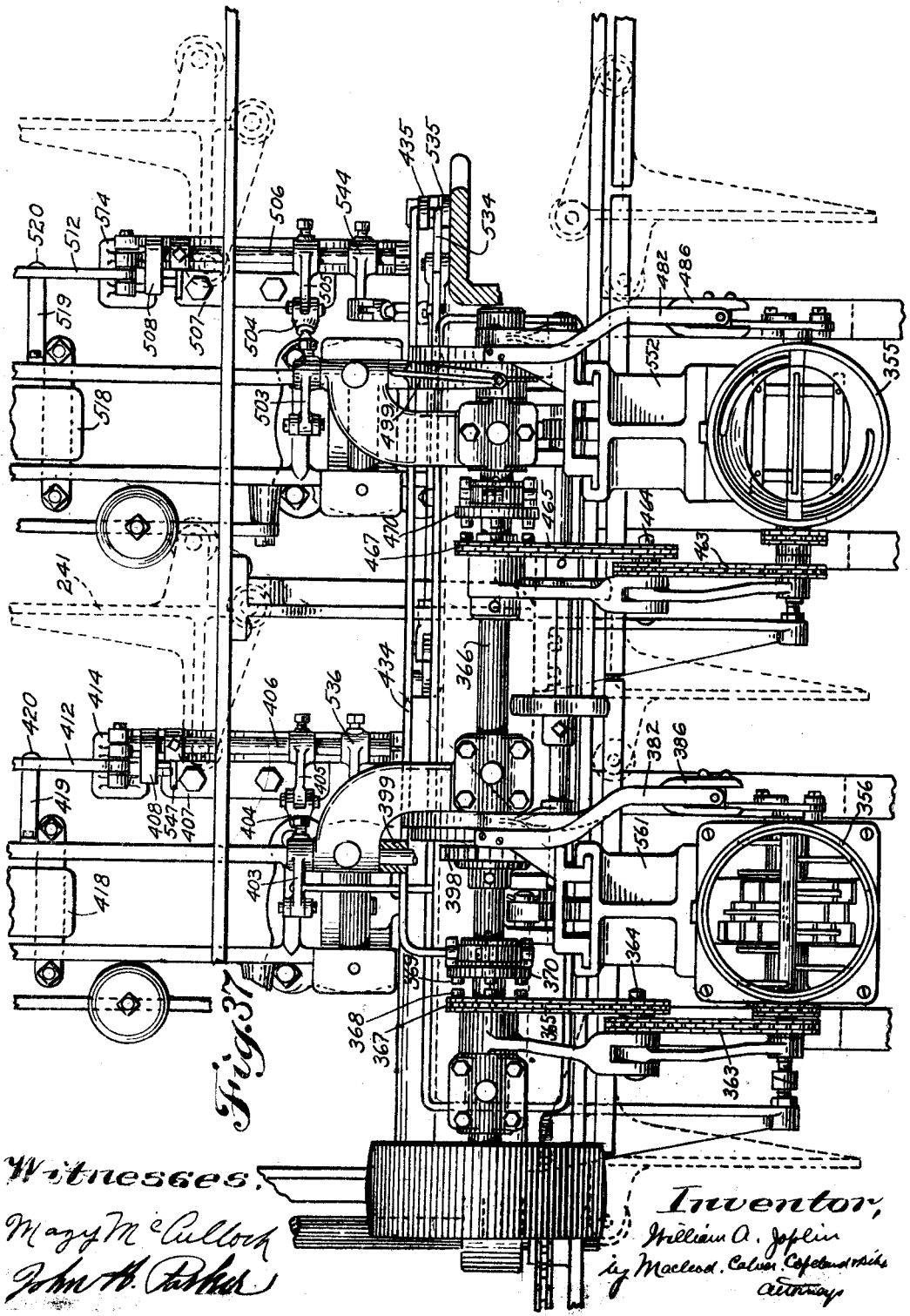

W. A. JOPLIN.
BAG FILLING MACHINE.
APPLICATION FILED JULY 9, 1915.
1,199,561.
Patented Sept. 26, 1916.
25 SHEETS—SHEET 20.
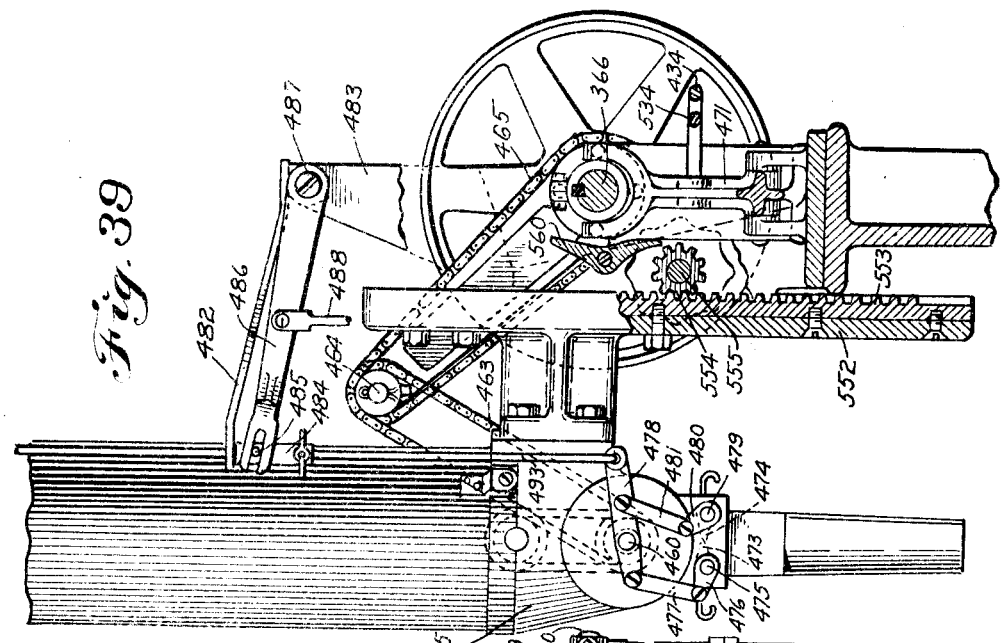
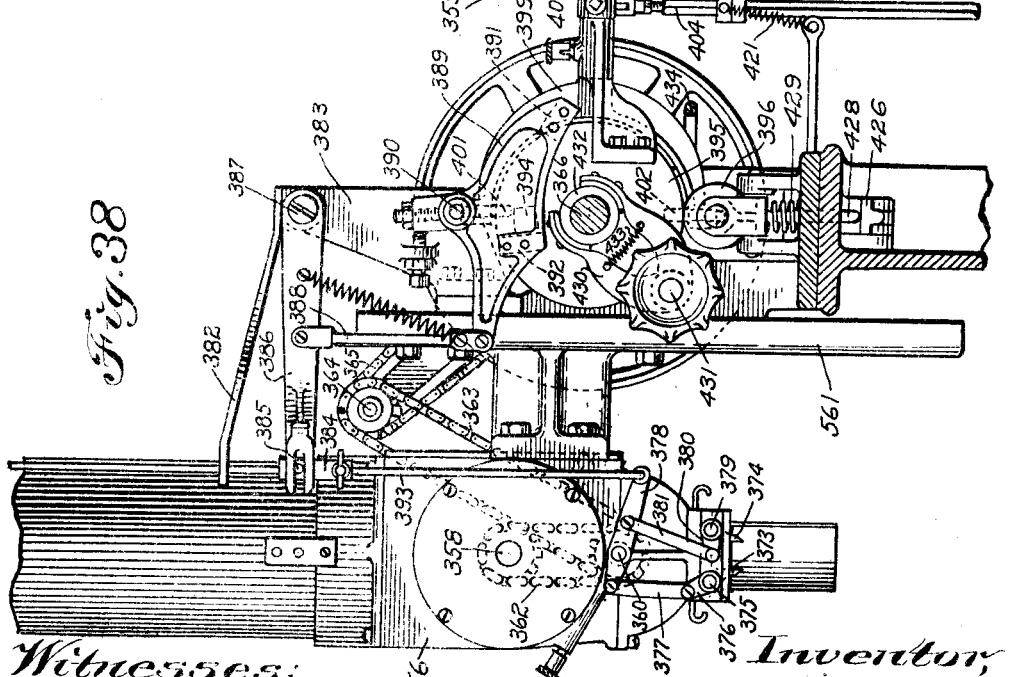

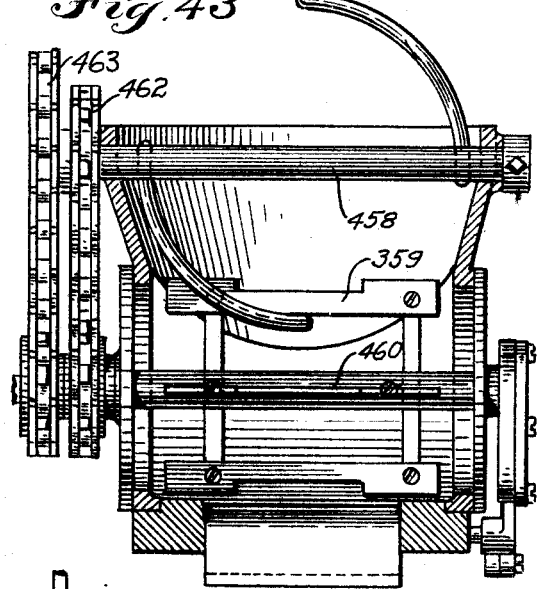
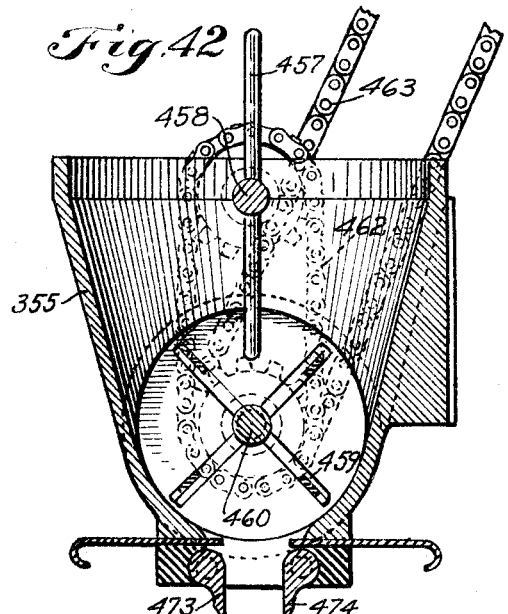
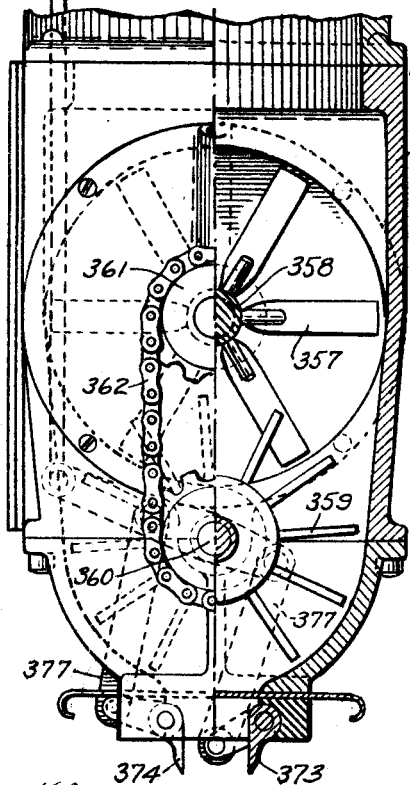
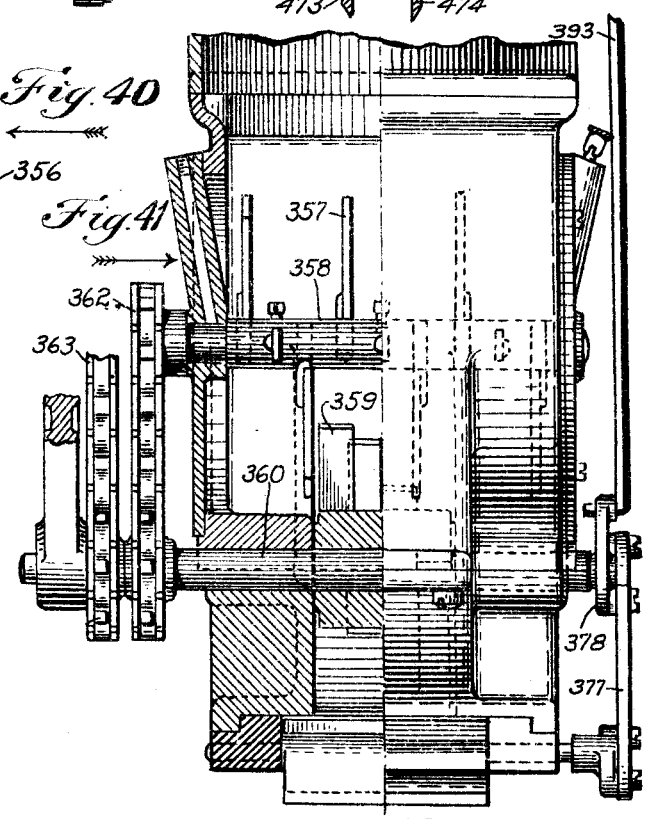

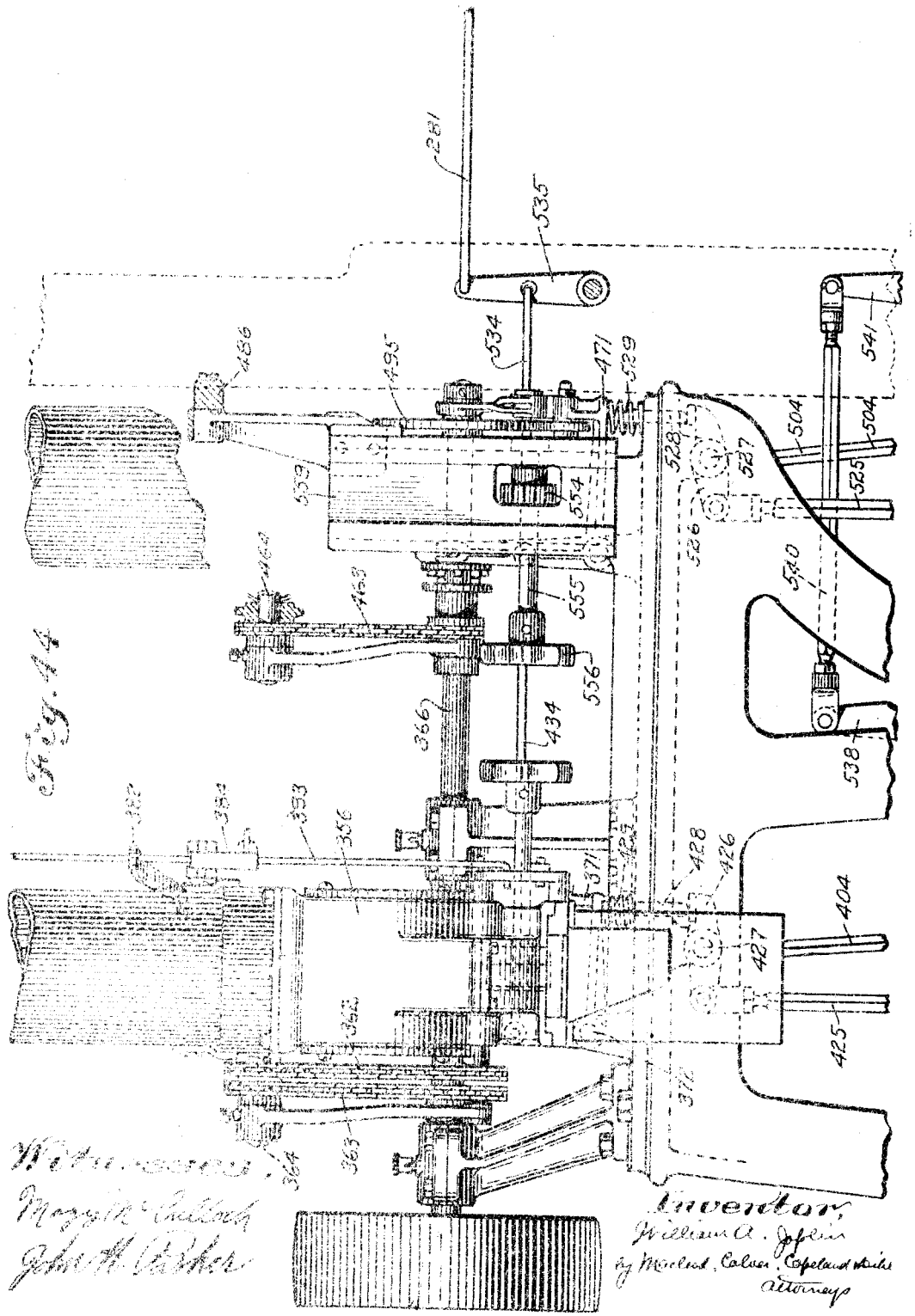

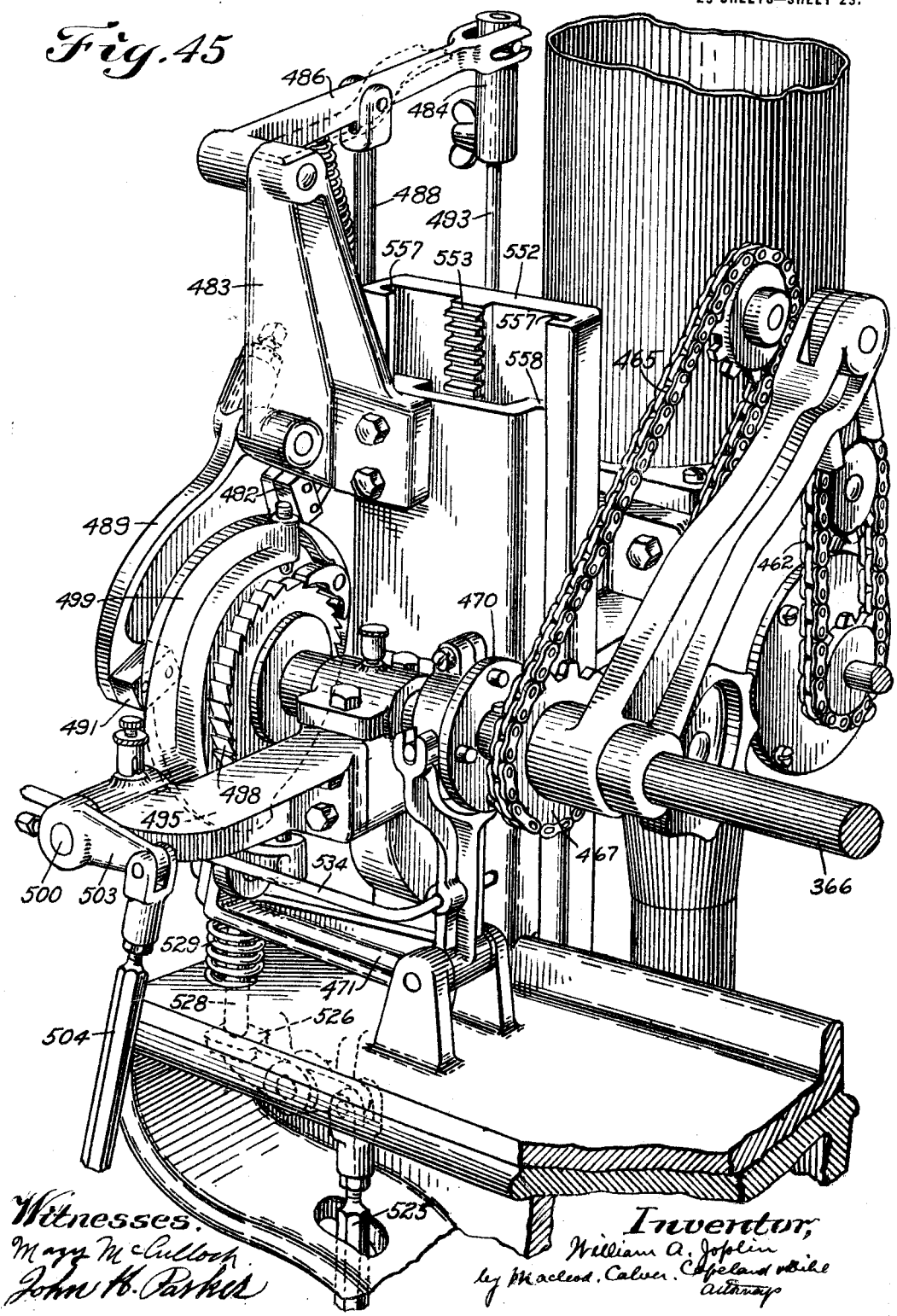

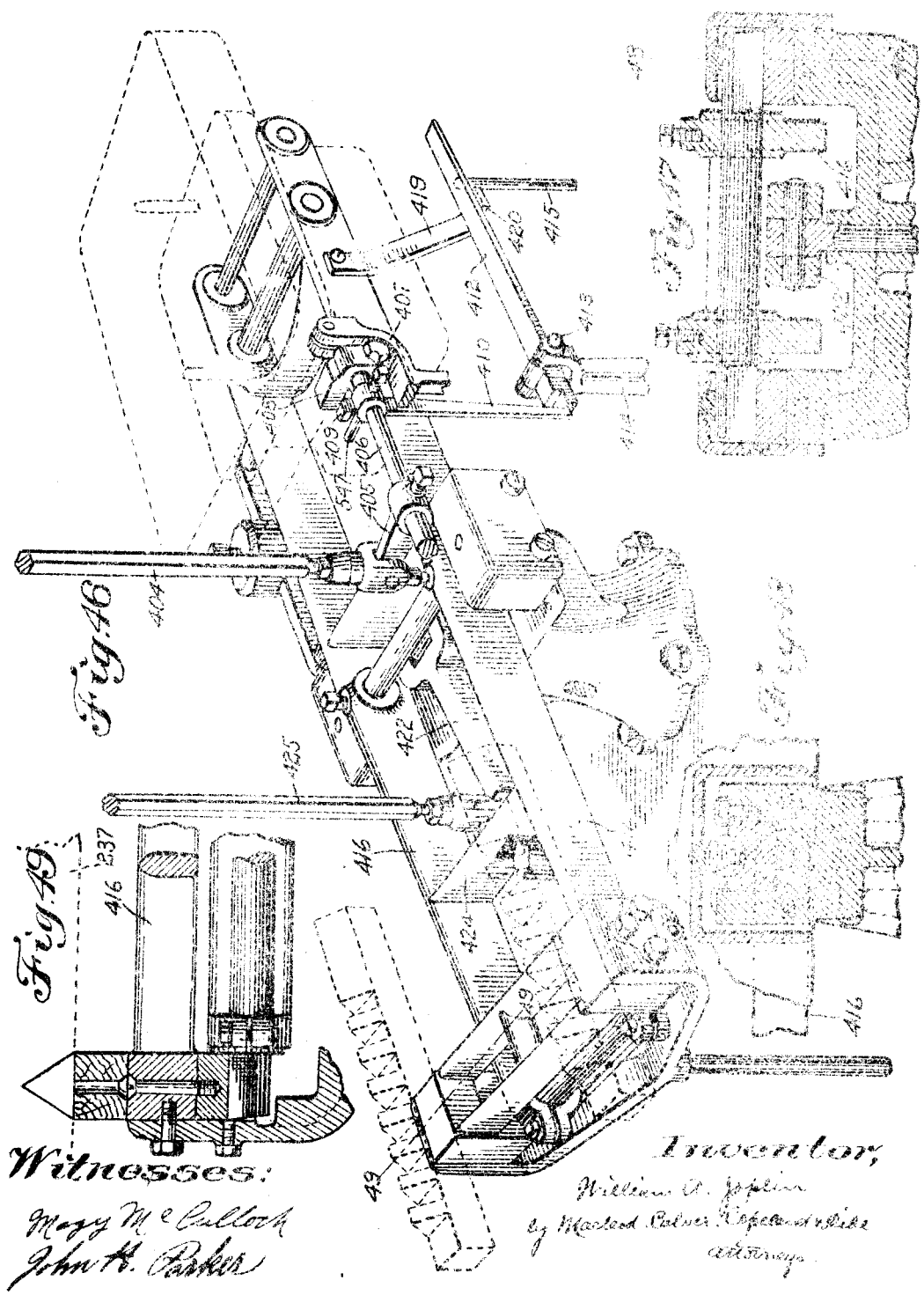

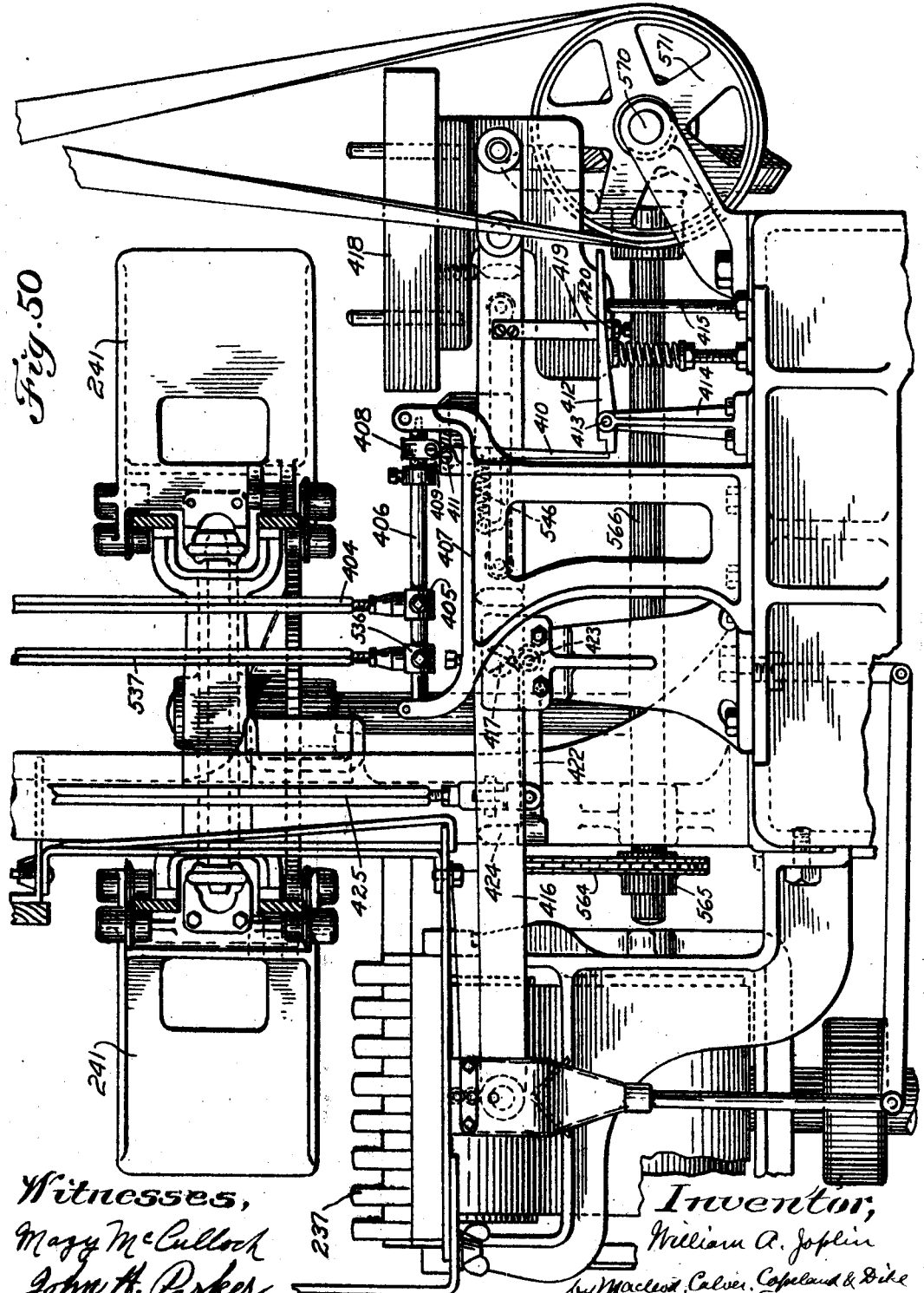

UNITED STATES PATENT OFFICE.

WILLIAM A. JOPLIN, OF QUINCY, MASSACHUSETTS, ASSIGNOR TO PNEUMATIC SCALE CORPORATION, LIMITED, OF QUINCY, MASSACHUSETTS, A CORPORATION OF MAINE.

BAG-FILLING MACHINE.

1,199,561.   Specification of Letters Patent.   Patented Sept. 26, 1916.

Application filed July 9, 1915. Serial No. 39,017.

*To all whom it may concern:*

Be it known that I, WILLIAM A. JOPLIN, citizen of the United States, residing at Quincy, in the county of Norfolk, State of Massachusetts, have invented a certain new and useful Improvement in Bag-Filling Machines, of which the following is a specification, reference being had therein to the accompanying drawings.

The invention is an improvement on the machine shown in U. S. Patents No. 716,007, No. 804,262 and No. 1,037,015. In each of the first two of said patents there is shown a vertically movable bag support in combination with a worm feed, a scale onto which the partially filled bag is deposited, a scale feed and a carrier which transfers the bag from the worm feed station to the scale. In the Patent No. 1,037,015 there is a worm feed and a vertically movable bag support but no scale.

In the machine embodying the present invention the bag is filled with approximate weight by a worm feed until the bag is filled to about a predetermined height, packed down by the worm feed and is then transferred to a scale where an additional quantity is fed at a comparatively rapid rate to the bag until it contains roughly the weight desired but a little short of the full weight and is then transferred to a second scale where a fine or drip stream is delivered to complete the accurate weight.

The worm feed works through a cylindrical hopper and the bag is supported on an elevator or vertically movable platform, the empty bag being slipped over the funnel until the lower end of the funnel extends substantially to the bottom of the bag and then the worm feed is started and as it feeds the material into the bag it packs it down and forces down the elevator and the bag with it as fast as the bag fills until the elevator has descended a certain distance, at which time the clutch which controls the operation of the driving shaft of the worm feed is disengaged so that the worm feed stops.

The mechanism which throws out the clutch at the same time throws in or renders operative other mechanism which causes the continued descent of the bag supporting elevator until the elevator has descended far enough for the upper end of the bag to pass clear of the cylindrical hopper and until the elevator platform has descended far enough to be on the level of another platform onto which the bag is to be transferred and carried to the first scale. When the elevator has descended to this lower level it actuates certain mechanism which disengages a pawl which has held in restraint the driving mechanism for a bag carrier. This carrier consists of an endless chain on which are mounted wings or plates at regular intervals apart equal to the distance between the bag on the platform and the first scale and the distance between the first and second scales and this carrier mechanism is then actuated through a distance equal to the distance between two carrier wings and then automatically comes to a stop. This movement of the carrier will move the bag which is on the second scale onto a delivery belt and will transfer the bag which is on the first scale to the second scale and will transfer the bag which is on the platform of the elevator onto the first scale. The carrier, however, cannot start even when the elevator has reached its lower level until both scales have dropped no matter whether the two scales drop simultaneously or successively. The dropping of both scales releases a latch on the tripping mechanism which controls the movement of the carrier, provided that the elevator has also reached its lower level. In other words, all three bag supports, that is, the platform and both scales, must have dropped to their proper position before the carrier can start.

As soon as the scale platform drops it thereby actuates mechanism which closes a shutter which shuts off the supply to the bag on that particular scale and there is mechanism which then immediately lifts the scale to its normal position while the filled bag is still on the scale and the scale is locked in that position. This drop and return of the scale is done so quickly that both scales will be back in position in time to receive the next succeeding partially filled bag. The shutters which control the delivery of the material to the bags on the scales are opened, and the releasing of the lock of the scales is actuated by the movement of the moving carrier just at the end of its period of movement. The pawl which engages the ratchet on the shaft that drives the carrier is tripped after one rotation of the shaft which will be just sufficient to move the carrier through the proper distance and the carrier will then remain at rest until the pawl is again thrown into engagement with the ratchet as previously described.

The invention will be fully understood when taken in connection with the accompanying drawings and the novel features thereof will be pointed out and clearly defined in the claims at the close of this specification.

In the drawings,—Figure 1 is a plan of a machine embodying the invention. Fig. 2 is a front elevation showing the lower part of the machine, the upper part being broken away. Fig. 3 is a front elevation partly broken away showing the upper part of the machine, the said Figs. 2 and 3 together showing substantially the entire front elevation of the machine. Fig. 4 is a plan on an enlarged scale showing the hopper mechanism. Fig. 5 is a side elevation viewed from the right end of Fig. 3 enlarged. Fig. 6 is a side elevation viewed from the left of Fig. 3 enlarged showing the brake mechanism. Fig. 7 is a front elevation enlarged from Fig. 3 showing the brake mechanism. Fig. 8 is a side elevation viewed from the right-hand of Fig. 2. Fig. 9 is a rear elevation partly in section of the lower part of the machine, the upper portion being broken away as in Fig. 2 and sectioned through the frame. Fig. 10 is an enlarged view of a portion of Fig. 9. Fig. 11 is a sectional view on line 11—11 of Fig. 10. Fig. 12 is an enlarged view partly broken away of the bag carrier driving mechanism shown in the middle portion of Fig. 10. Fig. 13 is a plan view of the parts shown in Fig. 12. Fig. 14 is an enlarged detail view of a portion of Fig. 10 showing the recoil mechanism for driving the bag carrier. Fig. 15 is a plan view of the parts shown in Fig. 14. Fig. 16 is an enlarged view of a portion of Fig. 10 showing the mechanism for throwing in the worm driving clutch. Fig. 17 is a plan view of the parts shown in Fig. 16. Figs. 18 and 19 are sectional views showing two different forms of worm feed, the form shown in Fig. 18 being intended for use with large bags and the form in Fig. 19 being intended for use with smaller bags. Fig. 20 is a front elevation on an enlarged scale from Fig. 1 showing the elevator mechanism. Fig. 21 is a vertical sectional view taken through the middle of Fig. 20. Fig. 22 is a detail side elevation section through shaft 102 showing the detail of fan-shaped pawl carrier shown in Fig. 34 for actuating the suction relief during the descent of the elevator. Fig. 23 is a view of the parts shown in Fig. 22 taken from the right. Fig. 24 is a detail view of one of the gears shown in Figs. 30 and 31 for automatically raising the elevator. Fig. 25 is a view of the parts shown in Fig. 24 looking up from the inside of Fig. 24. Fig. 26 is a side elevation of the pawl carrier sectioned through the shaft for operating the shutter for the scale hopper. Fig. 27 is a view of the parts shown in Fig. 26 viewed from the right of Fig. 26. Fig. 28 is a view on an enlarged scale of the upper right-hand portion of Fig. 8 viewed on the opposite side from Fig. 8 and showing the brake mechanism. Fig. 29 is a vertical sectional view on an enlarged scale of the dash pot shown in Fig. 28 for checking the movement of the elevator at the end of its up stroke. Fig. 30 is a plan view partly in section through the gear casing enlarged from Fig. 1 showing the mechanism for operating the elevator. Fig. 31 is a rear elevation of a portion of the machine showing the elevator actuating mechanism as shown in Fig. 30. Fig. 32 is a detail of the pawl carrier connecting with the mechanism for operating the suction relief in connection with the worm feed. Fig. 33 is a view from the right of Fig. 32. Fig. 34 is a vertical section through shafts 102 and 117 on an enlarged scale showing the mechanism for actuating the suction relief. Fig. 35 is a section showing some of the parts of Fig. 34 viewed in the opposite direction. Fig. 36 is a section on line 36—36 of Fig. 31. Fig. 37 is a plan partly in section through the frame of the front left-hand portion of the machine showing the two scale hoppers and the operative mechanism connected therewith. Fig. 38 is an elevation partly in section showing the second scale hopper and the shutter operating mechanism. Fig. 39 is an elevation also partly in section showing the first scale hopper and some of the operating mechanism, some of the corresponding parts which are shown in Fig. 38 being omitted for the purpose of showing other parts which are common to both scale hoppers. Fig. 40 is an elevation partly in section of the second scale hopper showing the stirrer mechanism and the shutters. Fig. 41 is a side elevation partly in section taken at right angles to Fig. 40. Fig. 42 is a vertical section of the first scale hopper. Fig. 43 is a vertical section of the first scale hopper taken at right angles with Fig. 42. Fig. 44 is a front elevation partly broken away showing the second scale hopper and some of the connecting mechanisms by means of which the shutters are operated. Fig. 45 is a perspective view on an enlarged scale of the first scale hopper and the immediate connecting mechanism. Fig. 46 is a perspective view on an enlarged scale showing the tripping levers connected with the scale. Fig. 47 is a cross sectional view across the pivot point of the second scale beam. Fig. 48 is a section on line 48—48 of Fig. 47. Fig. 49 is a section on line 49—49 of Fig. 46. Fig. 50 is a side elevation showing the second scale beam and some of the immediate connected mechanism as viewed from a line in Fig. 2 between the elevator and the first scale platform looking toward the left, the first scale and its connected parts being omitted for the purpose of more clearly showing the second scale.

Referring now to the drawings,—1 represents the main hopper into which the material to be packed into the bags is poured in bulk. From the bottom of the hopper 1 an inclined chute 2 conducts the material into a funnel extension 4, the lower end of which connects with a cylindrical nozzle 5 within which is a worm or screw feed 6 mounted on a rotary shaft 7. See Figs. 3, 4 and 5. The empty bag to be filled is to be drawn up over the nozzle 5 and a vertically movable platform 8 is actuated by mechanism which will be hereinafter described, in such manner that after the bag is first telescoped onto the nozzle 5 the platform 8 will be moved up so as to support the bag and form a yielding stop for the bag during the downward pressure exerted by the worm feed in the process of filling. The shaft 7 will be rotated so as to operate the screw feed to feed and pack the material into the bag, pressing down the bag and the platform on which it is seated until the platform has descended a certain distance when the worm feed will be stopped by automatic mechanism to be hereinafter described. See Figs. 2, 3, 7, 18, 19, 20 and 21.

The means for rotating the shaft 7 is as follows: Mounted on the upper end of shaft 7 is a bevel gear 9 which engages with a bevel gear 10 mounted on a horizontal shaft 11 which is journaled in bearings 12, 13. Loosely mounted on shaft 11 is a pulley 14 which is continuously driven by any suitable means and is adapted to be put into driving connection with the shaft 11 by suitable clutch mechanism. The clutch mechanism and actuating mechanism therefor as shown is as follows: A spool 15 is slidably mounted on the shaft 11. A lever 16 fulcrumed at 17 has its upper end bifurcated and provided with pins projecting from each branch of the bifurcation and engaging with a groove 18 in the periphery of the spool 15. By moving the lever 16 so as to turn it on its fulcrum the spool may be moved either in or out. Mounted fast on the shaft 11 is a disk 19 at one side of the pulley and projecting from one face of the disk near the rim is a pin 20 on which is hung a split ring 21 which is inside of the rim of the pulley and is normally of slightly less diameter than the inner periphery of the flange or rim of the pulley. A lever 22 is mounted on a stud 23 which projects from the disk 19 and has a squared portion 24, which engages between the ends 25 and 26 of the split ring so that when the lever 22 is rocked slightly it will turn the squared portion of the stud 23 in such manner as to bring two of its diagonally opposite corners into engagement with the two end portions 25, 26 of the split ring and thereby spread them apart and cause the split ring to frictionally engage with the inner periphery of the pulley and thereby cause the said split ring and the disk 19 to rotate with the pulley and thereby rotate the shaft 11 to which, as stated, the said disk 19 is made fast. See Figs. 3 and 5.

The lever 16 may be operated either by hand operated mechanism or by power, as desired. Hand operated mechanism is shown as follows:—The lower end of the lever 16 is connected with an operating lever 27 by means of a link 28, said lever 27 being pivoted at 29.

When the bag and the platform on which it is supported have been sufficiently depressed by the worm feed to cause the platform to descend to the proper level at which it disengages the clutch connection between the pulley 14 and the shaft 11 there is a tendency of the shaft 11 to continue of its own momentum to rotate for a short time and thereby to continue the operation of the worm feed. It is desirable however to stop such rotation as soon as possible after the clutch has been disconnected and mechanism for this purpose is provided whereby it will be quickly stopped without too great a shock. See Figs. 6 and 7. The mechanism is as follows: Mounted fast on the shaft 11 at the opposite end from the pulley 14 is a pulley 30, said pulley being shown as keyed to the shaft by a key 31. Mounted in bearing or bracket 32 is a stud 33 on which are journaled two semi-circular brake heads 34, 35 respectively which together surround loosely the rim of the pulley 30 and have upon their inner faces brake shoes 36 of leather or other suitable friction material which are adapted to engage the periphery of the pulley 30 when the lower open ends of the said brakes are forced toward each other but which are normally sprung apart from each other sufficiently to release the brakes from the periphery of the pulley. A lug 37 forms a part of the casting which composes the brake head 34 and a lug 38 forms a part of the casting of the brake head 35. A pin 39 is fast to lug 38 and passes loosely through said lug 37, and mounted thereon is a spring 40 which is under tension and which normally tends to keep the two brake members spread apart from each other. A link 41 is pivotally connected at one end with a stud 42 which projects from the brake head 34 and at its other end it is pivotally connected by a stud 43 with a lever 44, said lever 44 having at one end a nose 45 which bears against a shoulder on the brake head 35 and which is adapted when the lever 44 is turned in one direction to press the lower end of the brake member 35 toward the brake member 34 and also when the link 41 is drawn toward the left from the position shown in Fig. 6 it will at the same time draw the brake member 34 toward the brake member 35 and thereby set the brake. The lower end of the lever 44 is pivotally connected at 46 with a connecting rod 47 so that when said connecting rod 47 is moved to the left from the position shown in Fig. 6 it will cause the nose 45 to move toward the right and pull the connecting link 41 toward the left and thereby draw the brake members together and set the brake, as above mentioned. The opposite end of the connecting rod 47 from that which is connected with the pivot 46 is connected by a pin 48 with the lower end of a lever 49 fulcrumed at 50. The upper end of said lever 49 is pivotally connected at 51 with a bifurcated link 52 between whose bifurcations is pivotally connected one end of a lever 53. Said lever 53 is pivoted at 59 in a bracket 60. The opposite end of the lever 53 from that which is connected with link 52 is connected with one end of a spring 61 whose other end is connected with an adjustable support 62. The lever 52 is maintained by the spring 61 in contact with a roll 63 which is carried on a stud 64 mounted on one end of a lever 54 which is made fast on the upper end of a vertical rock shaft 55 whose lower end is made fast to the lever 56 connected by a stud 57 with one end of a connecting rod 58 whose other end is connected with the lever 16.

In Fig. 3, the spool 15 is shown as disengaged so that the shaft 11 is not rotated. When it is desired to start the machine the lever 27 will be moved to the right from the position shown in Fig. 3 thereby moving in the spool to make connection between the pulley 14 and the shaft 11 by expanding the split ring as already described so that the worm feed will begin to operate. By the same movement of the lever 16 the connecting rod 58 will be moved to the right from the position shown in Fig. 3 and to the left as viewed in Fig. 4, thereby turning the lever 56, the rock shaft 55, and lever 54, thereby turning the lever 54 from the position shown in Fig. 4 into a more nearly perpendicular relation with lever 53 and cause the roll 63 to ride along in engagement with the lever 53 and turn the lever 53 in a horizontal plane on its pivot thereby expanding the spring 61 which being under tension will pull the lever 53 back into its normal position when the lever 54 rocks back again into the position shown in Fig. 4. The turning of the lever 53 by the movement of the link 54 will rock the lever 49 from the vertical position shown in Fig. 6 so that the upper end of said lever 49 will move toward the left and the lower end will move toward the right thereby moving the connecting rod 47 to the right and causing the lever 44 to turn so that the nose 45 will move back from the position shown in said Fig. 6 thus allowing the spring 40 to spread apart the two semi-circular members of the brake, as already described, and thus release the brake pressure on the pulley 30 so as to leave the shaft 11 free to rotate without the friction of the brake.

The worm shaft 7 is subject to a good deal of longitudinal pressure due to the resistance of the material packed in the bag during the rotation of the feed and in order to relieve the upward pressure on the shaft it is journaled in two main bearing 65, 66 which are separated from each other by a ball thrust bearing 67 which may be of well known form of construction of ball thrust bearing. See Fig. 7.

The elevator platform 8 is preferably composed of a plurality of slats set on edge parallel with each other and spaced apart as shown in Figs. 8 and 21 with intervals between them through which the dust may fall instead of accumulating on the surface of the platform.

For practical convenience of having the platform when in its lowest position at a pretty low level for convenience of the workmen it is desirable that the platform should have a greater vertical range of movement than the elevator slide itself has and for that reason the platform is not only mounted on an elevator slide so as to move therewith but it also has a vertical movement with relation to the elevator and simultaneously therewith. The construction and arrangement of the elevator and the platform will now be described. See Figs. 11, 20, and 21. The elevator itself is composed of a framework consisting of a plurality of vertical bars, preferably two in number, 68, 69 tied together by cross bars 72, thus making a rigid frame. In order to guide and steady the elevator in its travel there are secured to the said bars 68, 69 plates 77 which carry rollers 78 which ride on the outer edge of the channel lips of the frame uprights 73, 74 and there are carried on the edge of the elevator frame rolls 79 whose diameter is just sufficient for them to fit between the lips of the channel and engage the said lips, thus forming roll bearings to guide and steady the elevator in its upward and downward movement.

A bracket 80 consisting of a casting is secured by bolts 81 to the frame of the elevator and has a foot 82 which is perforated vertically and through said perforation extends a rod 83 on the upper end of which is mounted the platform 8. The said rod 83 has its bearing in a shell 84 which partially surrounds the said rod 83 and a cap 85 which is secured to the said shell 84, the said shell 84 extending down through the aperture in the foot 82. The rod 83 is vertically slidable in said bearing. The upper portion of the said rod just below the platform is surrounded by a spring 86 which supports a flexible covering 87 for the purpose of forming a protection to prevent the dust which drops through the bottom of the platform from getting into the bearings for the rod 83. Secured to the side of the rod 83 is a vertical rack 88, and journaled in bearing 89 which forms a part of the cap 85 is a shaft 90 on which is mounted a pinion 91. Mounted also on said shaft 90 is a sprocket wheel 92. A sprocket chain 93 is made fast at one end to a fixed support 94 thence passes over said sprocket wheel 92 down and around a guide sprocket wheel 95 and thence around a guide sprocket 96, thence up and is secured to a hook 97 which is secured to the stanchion 73 which is stationary. The sprockets 95 and 96 are both mounted on the elevator. When the elevator rises from its lowermost position shown in Figs. 2, 8 and 20 the chain 93 will rotate the sprocket 92 and thereby rotate the pinion 91 which by its engagement with rack 88 will cause the rod 83 to rise in its bearings with relation to the elevator at the same time that the elevator is traveling and thus cause the platform 8 to rise not only a distance equal to the rising of the elevator but also a greater distance occasioned by the rack and pinion action.

Secured to the elevator frame as for instance by a hook 98 (see Figs. 8 and 20) is a sprocket chain 99 which extends up over a guide sprocket wheel 100, thence over a sprocket 101 mounted on a shaft 102, thence extends down and is connected with a counter weight 103 provided with a guide rod 104 which passes down through a guide opening in a bracket 105. Means are provided to rotate said shaft 102 in one direction to raise the elevator and in the reverse direction to allow the elevator to descend. A treadle 106 is pivoted at 107 and its rear arm is pivotally connected with the lever 108 which is pivoted at 109, the rear arm of said lever 108 being pivotally connected with a rod 110. (See Fig. 8.) The upper end of said rod 110 is pivotally connected with one arm of a bell crank rocker lever 111 pivoted on stud 112. The vertical arm of said rocker lever 111 has a forked end 113 which engages with a pin projecting from a shipper ring 114 loose on the hub of a clutch disk 115. (See Fig. 31.)

The clutch disk 115 is keyed to the shaft 117 in such manner as to slide upon said shaft but rotate therewith. Said clutch disk is formed with laterally projecting pins 118 which are adapted to engage with pins 119 on a disk 120 which is loose on shaft 117. Said disk 120 is fast to a pinion 121 which is also loose on said shaft 117. The said pinion 121 engages with an idler pinion 122 mounted on stud 123 mounted in the bracket 124 and said idler pinion 124 engages with a gear 125 fast on shaft 102. See Fig. 35. When the clutch disk 115 is thrown to bring the clutch pins 118 and 119 into engagement with each other the shaft 102 will be caused to rotate. The pinion 102 and disk 120 are prevented from longitudinal or sliding movement on the shaft 117 by means of the bearings 124 and the collar 126. When the clutch disk 115 is thrown to make the clutch engagement, as already described, by the depression of the treadle 106, the shaft 102 will rotate in a direction to raise the elevator by means of the sprocket chain 99.

It is necessary that the clutch connection which causes the upward drive of the elevator should be thrown out when the elevator has reached its proper elevation and mechanism for doing this is as follows: Secured to the side of the elevator and moving with it is a cam faced plate or projection 127. Pivotally connected with the lever 108 which is connected with the treadle 106 is a connecting rod 128, the upper end of said connecting rod 128 being pivotally connected with the lever 129 which normally stands at an inclination and carries a roll 130 at its upper end. When the elevator reaches the proper point in its ascent the said cam 127 engages with the roll 130 on the lever 129 and brings the lever 129 more nearly into a vertical position, thereby giving a downward thrust to the rod 128 and depressing the lever 108, thereby throwing up the pedal end of the treadle 106 and also lifting the connecting rod 110 and by means of its connecting mechanism thereby disengaging the clutch disk 115 and causing the shaft 102 to cease rotation, thus stopping the elevator.

As soon as the elevator has stopped in its upward ascent the worm feed should be started. The mechanism for accomplishing this is as follows: See Figs. 1, 2, 8, 9, 10, 12, 13, 16, 17. A shaft 131 is continuously driven as by pulley 132 and carries a bevel gear 133 which engages with a bevel gear 134 mounted on shaft 135. Mounted fast on said shaft 135 is a spur gear 136 which engages with a spur gear 137 mounted on shaft 138. Said shaft 138 carries a ratchet 139 which is fast on the shaft. Mounted loosely on said shaft is a pawl carrier disk 140 carrying a pawl 141 which is adapted to engage with a ratchet 139 but which is normally kept out of engagement therewith by a pawl stop 142. A spur gear 143 is made fast to the pawl carrier 140, being also loose on shaft 138 and engages with a spur gear 144 which is mounted loosely on the stud 145. The gear 144 is twice the circumference of the gear 143 so as to make one-half a revolution to each revolution of the gear 143 and carries projecting from its face two rolls 146 and 147 diametrically opposite to each other. A lever 148 is pivoted at one end at 149 to a bracket on the frame of the machine and extends beneath the lower end of the shaft 138 and carries at its farther end a fork 150 which is pivotally connected with a bell crank lever 151 pivoted at 152. One arm of said bell crank lever 151 is pivotally connected with one end of a connecting rod 153, the other end of said rod 153 being pivotally connected with one arm of a bell crank 154 fulcrumed at 155, the other arm of said bell crank carrying a roll 156 which in the normal position extends alongside of the elevator in such manner as to be engaged by a cam plate 157 which is mounted on the side of the elevator. See Fig. 20. A connecting rod 158 is pivotally connected with the same arm of the bell crank lever 154 as that with which the rod 153 is connected. The other end of said rod 158 is pivotally connected with one end of an arm 159 whose other end is fast to the shaft 29. When the elevator is in its lowermost position, as shown in Fig. 2, the cam 157 holds the bell crank 154 in such a position that through the connections above described the lever 16 will hold the worm feed clutch 15 out of engagement with the driving mechanism so that the worm feed will remain stationary. As soon as the elevator has risen sufficiently to carry the cam 157 past the roll 156 the bell crank 154 will be free to turn so as to throw the worm feed clutch into engagement by the proper mechanism therefor and such mechanism is timed so as to throw the worm feed clutch in just about the time the elevator reaches its top position. The mechanism for thus throwing the worm feed clutch into engagement is as follows: See Figs. 9 and 10. A spring 160, one end of which is secured to one end of the pawl stop 142 and the other end of which is secured to a fixed part of the frame, normally holds the pawl stop in operative position. Carried on the side of the elevator frame is a lever 161 pivoted at one end at 162 to the frame and at its other end carrying a roll 163. It is normally held from falling below the position shown in Fig. 9 by a stop pin 164 but it is free to be turned up. A tripping lever 165 is pivoted at 166 to a stationary part of the frame of the machine having one arm which bears against the pawl stop 142. The other arm of said lever 165 extends out into the path of the roll 163 so that when the elevator rises said roll 163 will engage the lever 165 and turn it on its pivot so that the arm of said lever which engages the pawl stop 142 will turn the pawl stop out of engaging position with the pawl 141 thereby allowing the spring 167 to throw the pawl 141 into engagement with the ratchet 139 whereby the pawl carrier 140 and gear 143 will be caused to rotate thereby also rotating the gear 144 and causing the roll 146 to move the lever 148 and said lever 148 through its connection with the bell crank 151 will turn said bell crank in a direction to pull down the rod 158 and thereby cause the engagement of the worm feed clutch and at the same time the bell crank 154 will be turned into position where the cam roll 156 will be ready to be engaged by the cam 157 on the descent of the elevator to disengage the worm feed clutch at the proper stage in the descent of the elevator.

While the elevator is descending under the pressure of the worm feed, inasmuch as the counter weight practically balances the weight of the elevator and the parts which it carries there should be some elastic resistance to the downward pressure of the worm feed, otherwise the worm feed will not pack the material sufficiently compactly into the bag. The mechanism for doing this consists of a brake mechanism which will be described.

After the worm feed stops it is necessary to cause the elevator to descend a little farther, sufficient to bring the mouth of the bag away from the funnel and it is desirable that this continued descent should be at a rather slow speed so as to prevent too great suction which tends to loosen the material in the top of the bag which has last been packed. This is accomplished by giving a continued rotation to the shaft 102 which carries the sprocket over which the chain 99 runs which is connected with the elevator. This mechanism will now be described. See Figs. 5, 8, 28, 30, 32, 33, and 34. A connecting rod 168 is hung at its upper end from the same stud as the rod 158 and its lower end is pivotally connected with one arm of a bell crank lever 169 fulcrumed at 170, the other arm of said bell crank being pivotally connected with one end of the rod 171 whose other end is pivotally connected with one arm of a bell crank 172, the other arm of said bell crank being connected with one end of a connecting rod 173. The other end of said rod 173 rests upon a roll 174. Intermediate its ends said rod 173 carries a latch plate 175 which normally engages a pawl stop 176 pivoted at 177. The forward end of said pawl stop is adapted to engage with a pawl 178 and holds said pawl out of engagement with the ratchet 179 which is loose on shaft 102. Said ratchet 179 is fast to gear 180 which is loose on shaft 102. The pawl carrier 181 which carries the pawl 178 is also loose on said shaft 102. Said pawl carrier 181 has a cam projection 182. Gear 180 meshes with a gear 183 which is fast on the continuously rotating shaft 117. When the rod 173 is moved in one direction it will carry with it the latch 175 which engages the pawl stop 176 thereby allowing the pawl 178 to engage with the ratchet 179, thus giving a rotation to the pawl carrier 181 and allowing the cam 182 to engage with a roll 184 mounted on a lever 185 which at one end is pivoted loosely on shaft 117. The other end of said lever 185 is pivotally connected with a rod 186, said rod 186 being also pivotally connected with a stud 187. A fan shaped pawl carrier 188 is mounted loosely on shaft 102 and carries a pawl 189 which is adapted to engage a ratchet 190 fast on shaft 102. See Figs. 22 and 23. A stop screw 191 is adapted to hold the pawl 189 out of engagement with said ratchet 190. See Fig. 24.

When the pawl 178 is in engagement with the ratchet 179 and the pawl carrier 181 rotates far enough for the cam projection 182 to engage with the roll 184 carried on the lever 185 the lever 185 is thereby rocked to the right as viewed in Fig. 34, thereby also moving the rod 186 in a direction to pull over the fan-shaped pawl carrier 188 to the right as viewed in Fig. 34. This movement of the pawl carrier 188 is far enough to not only release the pawl 189 from the stop screw 191 and permit the pawl to become engaged with the ratchet 190, but also a little farther, and in so doing will cause the ratchet 190 and the shaft 102 to turn slightly in the same direction that the shaft was rotating during the operation of the worm feed thus carrying the elevator to a slightly lower level which will be sufficient to withdraw the mouth of the bag from the funnel. It is also desirable to give a still further downward movement to the elevator beyond that produced by the said movement of the bell crank 185. Mechanism for doing this will be described. Pivotally connected with one arm of the bell crank lever 185, it being the other arm than the one which is connected with the lever 186 is a rod 192. The lower portion of the said rod 192 is formed with a boss 193 with a vertical slot therein through which passes a lever 194, said lever being fulcrumed on the stud 195 in a bracket connected with the frame. One arm of said lever is provided with a handle portion 196 whereby the said lever may be operated by hand if desired to throw the clutch, which is to be hereinafter described as being actuated by said lever, the other end of said lever being connected at 197 with a connecting rod 198 whose purpose will be hereinafter described and being also pivotally connected with a link 199, the upper end of said link having a swivel connection 200 with one arm of a bell crank lever 201 fulcrumed at 202, the other end of said bell crank having a fork 203 which engages with a pin projecting from a shipping ring 204 loose on the hub of a clutch disk 205. See Fig. 34. Said clutch disk 205 is keyed to the shaft 117 in such manner as to be slidable thereon and carries pins 206 which are adapted to engage with pins 207 which project from a disk 208 which is loose on shaft 117. Said disk 208 is fast to the pinion 209 which is loose on said shaft 117 and said pinion 209 engages with a gear 210 mounted on shaft 102.

When the bell crank lever 185 is turned down in the manner previously described by which it turns shaft 102 after the worm feed has stopped such movement of the bell crank will be sufficient to push down the connecting rod 192 and thereby through the connections just described will turn the bell crank lever 201 sufficiently to cause the clutch pins 206 to engage with the clutch pins 207 and thereby through the pinion and gear connections rotate shaft 102 in the same direction that it was carried by the said first movement of the bell crank 185 and the said shaft 102 will rotate far enough to allow the elevator to descend to its lowermost level.

If when the clutch disk 205 is first moved to carry the pins 206 into engagement with the pins 207 the position of the disk is such that the pins strike end to end there should be some yielding action until the pins rotate past each other, otherwise there will be damage to some of the parts. For that reason the rod 192 has a yielding connection with the lever 194 as shown in Fig. 34. The said connection is as follows: The boss 193 through which the lever 194 passes is formed with a transverse elongated slot 211 which extends entirely through the boss and the lever 194 is provided with a pin 212 which passes through said slot 211. A spring 213 is secured at one end to said pin 212 and its other end is secured to a pin 214 projecting from the lower end of the rod 192. There is a spring corresponding to spring 213 on the opposite side of the rod 192 from that shown in Fig. 34 so as to make an even tension. These springs 213 are of sufficient strength so that under ordinary conditions the downward movement of the rod 192 will carry the lever 194 down with it but the spring yields to allow a slight upward movement of the lever in relation to the movement of the rod 192 in case of any obstruction such as occasioned by the said clutch pins meeting end to end. When the elevator reaches its lowest level desired it is necessary that the said clutch pins 206, 207 should be disengaged so that the shaft 102 will stop rotation. Mechanism is provided by which the downward movement of the elevator itself causes such disengagement. See Fig. 8. The lower end of said rod 198 is pivotally connected with the lever 215 which is fulcrumed on a stud, not shown, but in alinement with the stud 109 on which the lever 108 is fulcrumed. The forward end of said lever 215 is free and extends beneath the elevator frame in such position that just before the elevator frame reaches the bottom of its descent it will engage said lever and depress that arm of the lever, rocking it on its pivot thus lifting the rear arm of the lever and lifting the rod 198 which will cause the bell crank 201 to rock in the reverse direction from that previously described at the time it causes the engagement of the pin clutch 205 and will thereby disengage the clutch.

The brake mechanism for retarding the descent of the elevator under the pressure of the worm feed is as follows: See Figs. 28 and 31. Mounted loosely on the shaft 102 is a pulley 216. Mounted fast on said shaft is a ratchet 217. A pawl 218 carried on the side of the pulley engages with the teeth of said ratchet 217, being held in engagement therewith by a spring 219. When the shaft rotates in the direction which carries the elevator upward, that is, contrary to clock movement, the ratchet teeth will slip past the pawl and the pulley will remain stationary. When the shaft 102 rotates in clock-wise direction as it does during the descent of the elevator, the ratchet teeth will engage with the pawl and thus turn the pulley 216. A flexible strap 220 of leather, canvas, or other suitable brake material is made fast at one end to a stationary stud 221 and at its other end is secured to the short arm of a bell crank lever 222 fulcrumed at 223. A weight 224 is hung on the long arm of said bell crank lever, said arm being formed with notches 225 so that the hanger arm 226 of said weight may be adjusted to different positions on the arm and held in its adjusted position in any one of the notches. This weight gives tension to the brake strap 220 on the pulley and thus retards the rotation of the shaft 102 and therefore the descent of the elevator.

It is unnecessary to keep the brake on the pulley 216 during the final period of descent of the elevator and therefore means are provided for releasing the brake after the movement of the elevator due to the bell crank 185. The brake does not need to be applied again until after the elevator has reached the top of its upward stroke but for convenience the brake is applied just as the elevator begins its ascent as it will not interfere with the movement of the elevator. The mechanism for releasing and reapplying the brake is as follows: A connecting rod 227 passes loosely through the rear end of the long arm of the bell crank lever 222, its lower end being pivotally connected with the lever 228. Collar 229 pinned to the said rod 227 supports the arm of the lever 222 and lifts the long arm of the said lever 222 when the connecting rod 227 is raised. Said lever 228 is fulcrumed at 581 to a fixed support. A connecting rod 230 is connected with the upper end of lever 231. The lower end of said lever 231 is connected rigidly with the shaft 232. Said shaft 232 is mounted in suitable bearings and is capable of being rocked in its bearings. Secured to said rocker shaft is a lever 233. A cross piece 234 is made fast to the rod 192 and has secured thereto two pins 235 both of which are adapted to engage with said lever 233 and thereby to rock said shaft 232 when the rod 192 descends. This downward movement of the rod 192 takes place during the latter part of the second period of the downward movement of the elevator, namely, that produced by the bell crank 185, during which period as previously described it is important that the brake shall be applied. This rocking of the shaft 232 causes the lever 231 to swing toward the right from the position previously occupied into the substantially vertical position shown in Fig. 28, thereby moving the connecting rod 230 to the right and turning the lever 228 toward the right, as shown also in said Fig. 28, said lever having previously been turned to incline toward the left. The said connecting rod 227 will also during this previous period have been inclined in a left-hand downward direction, making an angle with the lever 228 in a direction opposite to that shown in Fig. 28 but a considerably larger angle. As the rod 230 thus swings toward the right it will turn the lever 228 and rod 227 from their previous angular position first into alinement with each other and then beyond the alinement into the angular position shown in Fig. 28. When they are moved into the position shown in Fig. 28 the long arm of the lever 222 will be turned up thereby slackening the brake 220 on the pulley. The brake will remain off during the final descent of the elevator and also during the period when the bag is being removed by the carrier, as will be hereinafter described. At the end of that time when the elevator begins to rise again the brake will be applied by mechanism which will be described hereinafter at the proper time in connection with the description of the other mechanism.

As previously stated, the package is to be transferred from the scale platform 8 to a scale on which a portion of the amount required is to be delivered to the bag, thence to a second scale on which the package is to rest while the balance of the load is delivered to it. The first scale platform 236 is located alongside of the elevator platform 8 normally on the same level as the elevator platform in its lowest position. The second scale platform 237 is located alongside of the first scale platform 236, also on the same level, the three platforms being so located with relation to each other that the package or bag may be made to slide from one platform to the other. See Figs. 1 and 2. Preferably they are located adjacent each other so that the bags pass from one platform directly to the other. Intermittently moving carrier mechanism is provided which shall have a range of movement preferably just enough at each period to carry a package from one platform to the next. See Figs. 1, 2, 8, 9, 10 and 11. This carrier consists preferably of an endless chain 238 which runs over two sprocket wheels 239 and 240 and which carries a series of angle plates or wing plates 241 at intervals apart equal to one of the stages of movement of the carrier, each of said wing plates being adapted to engage and push the package along on the platform. Each carrier wing has two horizontal arms, one at the top and one at the bottom of the wing, each of said arms carrying a roll 242 and these rolls move along against the front faces of the two rails 243 and 244 respectively during the travel of the carrier. Each roll is formed with a horizontal flange 245 the flange of the upper roll engaging the upper edge of the top rail and the flange of the lower roll engaging the lower edge of the bottom rail. Each carrier wing also carries an upper and a lower roll 250 which engage respectively the said upper and lower rails on the rear face, that is the opposite face to that engaged by the rolls 242 and it also carries a roll 251 which engages the front face of the lower rail, the three sets of rolls being for the purpose of steadying the carrier wing in its travel. The left-hand sprocket 240 as viewed in front elevation, see Figs. 1 and 2, is mounted on a stud 246, and the right-hand sprocket 239 is mounted fast on the vertical shaft 247 which is journaled in bearings 248 and 249. See Figs. 2, 9 and 10.

The carrier is driven by mechanism controlled by the downward movement of the elevator and safety mechanism controlled by the tipping of the two scales so that the carrier cannot be moved until the elevator platform has reached its lowest position and also both scales have been tipped. At present the mechanism controlled by the elevator will be described and the safety mechanism is to be hereinafter described. See Figs. 2, 9, 10, 12 and 13.

The sprocket shaft 247 is intermittently driven by mechanism which will be described. On the upper end of said shaft 247 is mounted a spur gear 252 which meshes with a pinion 253 which is loose on shaft 135. A pawl carrier disk 254 is rigidly connected with the pinion 253 and is also loose on shaft 135. A ratchet 255 is fast on said shaft 135 and is adapted to be engaged by a pawl 256 carried by the pawl carrier 254. Said pawl 256 is normally held out of engagement with the ratchet by a pawl stop 257. When however the said pawl engages with the ratchet 255 the said pawl carrier and pinion 253 will be rotated and thereby give rotation to the connecting mechanism, to the carrier shaft 247 and movement to the carrier. The pinion 253 is just one half the circumference of the gear 252 and therefore at each rotation of the pinion 253 the gear 252 will make a half rotation and each half rotation of the gear 252 is sufficient to move the carrier through one stage of its travel.

The pawl stop 257 is pivoted at 258 and at its rear end it is pivotally connected with a connecting rod 259 by means of a pin 260 which projects from the side of the pawl stop and which engages with an elongated slot 261 in the rod 259. The purpose of the elongated slot will be described later. A spring 262 one end of which is connected with said pin 260 and the other of which is fast to the side of the rod 259 is of sufficient strength so that normally it will hold the pin 260 in the lower end of the slot 261.

The lower end of the rod 259 is pivotally connected at 263 with a curved lever 264, one end of which is fulcrumed at 265, the other end being pivotally connected with a steel latch 266 intermediate the ends of said latch. The lower edge of the outer portion of said latch 266 is formed with an inclined face 267. The heel of said latch is connected by a spring 268 with said curved lever 264 and normally holds the upper edge of the heel of said latch up against the lower end of the vertical rod 259. A steel plate 269 is secured to a bracket carried by the elevator frame and has an inclined inner end 270, the location of the said plate 269 being such with relation to the latch 266 that on the upward movement of the elevator the inclined face 270 will engage with the inclined face 267 of the latch, turning the latch on its fulcrum sufficiently to allow the plate 270 to ride up past it and when it has thus moved past the said latch, the latch will immediately be restored by the spring 268 to its normal position. When the elevator descends from its uppermost position, then just before it reaches the bottom of its descent, the lower edge of the plate 269 will engage the upper edge of the latch 266 which by reason of its heel engaging the lower end of the rod 259 cannot turn on its fulcrum and therefore the curved and downwardly inclined lever 264 will swing downwardly and slightly inwardly in a curve until the latch 266 has been swung in its curved path far enough for the plate 269 to ride down past it. During the downward swing of the said curved lever 264 it will pull down the vertical rod 259 and thereby pull down the upper end of the pawl stop 257 provided said pawl stop is not restrained by engagement of one or both of the levers 277 and 278 whose function will be hereinafter described, thereby swinging it out of engagement with the pawl 256 and allowing the pawl 256 to be brought into engagement with the ratchet 255 by the spring 271. When the pawl is thus engaged the disk 254 and the intermediate mechanism for driving the carrier already described will move until the said ratchet has made one complete rotation, at which time the pawl stop 257 which in the meantime will have been turned back into its engaging position will engage the pawl to trip it out of engagement with the ratchet and thereby stop the carrier.

It is important that the pawl stop 257 shall be locked in engaging position so that it cannot be accidentally moved out of engaging position from the pawl until the elevator has descended to the lowermost position for the proper time for the carrier to be moved, otherwise if the pawl stop is accidentally moved out of engagement the carrier may start too soon. See Figs. 9, 10 and 11. A lever 272 fulcrumed at 273 to the frame of the machine is formed at its upper end with a notch 274 which is adapted to engage with the lower side of the rear end of the lever 257 and when so engaged it holds the pawl stop 257 in operative position. The lower end of said lever 272 is formed with a cam face 275 which is adapted to be engaged by a projection 276 carried by the elevator frame when the elevator frame is just reaching its lowermost position. In the descent of the elevator when the said projection 276 engages with said cam face 275 it will turn said lever 272 on its fulcrum into the position shown in Fig. 11 disengaging the notch 274 from said lever 257 but until that time said notch will remain in engagement with the lever and hold the pawl stop in operative position. It is also important that the said pawl stop shall not be disengaged until both scales have tipped as well as that the elevator shall have reached the bottom of its travel. Two levers 277 and 278 respectively lying side by side are both fulcrumed on the same stud 279, the upper end of said lever 277 being pivotally connected with a rod 280 which is operatively connected with the first scale mechanism and the lever 278 being pivotally connected with a rod 281 which is operatively connected with the second scale mechanism, the operation of which will be later on described. The lower end of each of the said levers 277, 278 is formed with a hook which is adapted to engage with the under side of a plate 282 carried on the upper side of the lever 257 and when so engaged by either one of said levers 277, 278, the said pawl stop 257 will be held in operative position independently of the said locking lever 272 and irrespective of the downward pull of the rod 259 when the elevator has made its descent. Said levers 277, 278 are thus held in engagement with the plate 282 until they are respectively tripped by the tipping of the scale with which they are connected by the mechanism which will be later on described.

If the elevator has completed its descent thereby carrying down the rod 259 before the levers 277 and 278 are tripped by the scales the pawl stop 257 will be prevented from being carried down with the rod 259, the movement of the rod 259 without the movement of the pawl stop being permitted by reason of the elongated slot 261 and therefore the spring 262 will be put under tension so that just as soon as the levers 277 and 278 are released from engagement with the lever 257 said spring 262 will pull down the rear arm of the pawl stop and throw the pawl stop 257 out of engagement with the pawl and allow the pawl 256 to engage with the ratchet, provided the said rod 259 has in the meantime been left in its downward position so that the spring 262 is maintained under tension. A spring 290 one end of which is fast to the frame and the other end of which is secured to the curved lever 264 is put under tension when the curved lever is carried down, and tends to swing said curved lever 264 back to its normal position and raise rod 259 after the plate 270 has in the descent of the elevator moved off of the latch 266.

If the elevator has completed its descent before both scale beams tip so that the rod 259 is carried down before the pawl stop is released by the levers 277, 278, as above described, it is important that the said rod 259 shall not be allowed to move up again but should be kept down so as to retain the tension on the spring 262 until after the pawl stop 257 is released by the levers 277, 278. To this end mechanism is provided as follows: See Figs. 12 and 13. A latch 283 of bell crank shape which is pivoted at 284 has a downwardly extending arm which extends down alongside of the rod 259. The rod 259 carries a plate 285 which is so positioned that when the rod 259 is in its uppermost position the upper end of said plate 285 will be above the lower end of the latch 283 but when the said rod 259 is carried down the said latch 283 may if allowed to swing on its pivot engage the upper end of said plate 285. A spring 289 made fast at one end to the frame and at the other end to the short arm of the latch 283 tends to pull the said latch into position for the said lower end to engage with the plate 285 when the said rod 259 is thus moved down. Said spring 289 will thus turn the latch 283 to engage the plate 285 when the rod 259 is carried down by the descent of the elevator, said spring being sufficiently powerful to turn said latch and also to turn down the rear arm of lever 286 which bears against the latch. It is important, however, that the said latch should be tripped before the pawl carrier has made one rotation in order that the package carrier shall be stopped at the end of its proper period of movement so that the rod 259 may rise to its normal position and move the pawl stop 257 into engaging position and for convenience mechanism is provided by which it will be tripped during the movement of the carrier. A lever 286 fulcrumed at 287 has one arm which is adapted to engage the under side of the short arm of the latch 283, the other arm having a bent portion which extends into the path of a roll 288 carried on the periphery of the pawl carrier 254. After the pawl stop has been released so that the pawl carrier and the package carrier begin to move, the said roll 288 in the course of rotation of the pawl carrier will come around into engagement with the upper edge of the curved arm of the lever 286 and turn said lever on its pivot thereby turning up the rear arm and turning the latch 283 out of engagement with the plate 285 on the lever 259. The said latch will thus be turned at first a little more than shown in Fig. 10. It will be turned far enough for the short arm of the latch to engage the under side of the pawl stop 257 and serve to positively turn said pawl stop to bring it back into operative position if for any reason the spring 262 shall have failed to do so. It is intended however that the spring 262 shall actuate the pawl stop and the actuation by the latch to restore the pawl stop to operative position is intended mainly as a safety arrangement.

It is desirable that after the partially filled bags have been deposited on the respective scales by the movement of the carrier wings that the carrier wings shall be withdrawn from contact with the bags during the time that the bags are receiving their supply of material in order that the frictional engagement of the wings with the bag may not interfere with the accurate weighing and for this reason mechanism is provided whereby at the end of each forward movement of the bag carrier the wings will be moved slightly backward. This is accomplished by giving a slightly reverse turn to the shaft 247 which drives the carrier and mechanism for doing this is as follows: See Figs. 10, 11, 14 and 15. Mounted fast on shaft 247 is a two armed lever 291, the said two arms being diametrically opposite to each other and similar to each other so that each arm is effective at alternate half rotations of the shaft 247, the said shaft 247, as previously stated, making only a half revolution for each forward movement of the carrier. Mounted loosely on the continuously revolving shaft 138 is a pawl carrier 292 which carries a pawl 306 adapted to engage with a ratchet 293 mounted fast on said shaft 138 but which is normally held out of engagement with said ratchet by a pawl stop 294. When the said pawl is in engagement with the ratchet 293 said pawl carrier will be caused to rotate in clockwise direction. Carried on the under side of the pawl carrier 292 is a roll 295 which during the rotation of the said pawl carrier 292 will engage one of the arms of the lever 291 thereby turning said lever 291 in a direction contrary to clockwise movement and give a reverse rotary movement to the shaft 247 until the said roll has ridden off of the lever 291. This reverse rotation of the shaft 247 will give also a reverse movement to the sprocket 239 and a backward movement to the carrier wings 241 causing them to retire from engagement with the bag. As the shaft 247 makes the reverse rotation it will also give a reverse rotation to the gears 252, 253 and the pawl carrier 254. This reverse movement of the pawl carrier 254 has a tendency to release the pawl 256 from engagement with the pawl stop 257 and if thus released the pawl would immediately engage with the ratchet 255 and start the carrier forward again which must be prevented. Mechanism is therefore provided whereby the pawl 256 will still be kept out of engagement with the ratchet. A lever 296 fulcrumed at 297 has a cam faced end 298 which is adapted to be engaged by a roll 299 mounted on the periphery of the pawl carrier 292, see Figs. 13, 14 and 15, said lever being held up in said engaging position by a connecting rod 300, one end of which is connected to said lever 296 and the other end of which is connected with a lever 301. When said pawl carrier 292 rotates far enough around for said roll 299 to engage with the cam face 298 it will turn said lever 296 downward and pull down the said connecting rod 300 and also pull down the arm of the lever 301 to which said rod is connected. Said lever 301 is fulcrumed at 302 (see Fig. 11) and has a downwardly extending arm 303 and engages with a friction washer 304 mounted on a stud which is connected with the frame so that the said lever 301 will remain in any position to which it is turned until it is positively moved again. A lug 305 is fast to the lever 301 and extends downward in a position adapted to engage the heel of the pawl 256 and hold it out of engagement with the ratchet 255. Said lug is in this engaging position when the vertical connecting rod 300 is pulled into its downward position in which it will be during the aforesaid reverse movement of the carrier shaft and is accomplished by the roll 299 on the pawl carrier 292, as previously described. When the lever 301 is in its downward position it engages with the upper side of the pawl stop 257. The said pawl stop lug 305 should be disengaged from the pawl 256 after the said reverse movement of the carrier mechanism so that the pawl 256 may be allowed to reëngage with the ratchet. When the said pawl stop 257 is turned in a direction to release it from the said pawl 256 it will lift up the said lever 301 and therefore release the pawl stop lug 305.

The mechanism for starting the movement of the pawl carrier 292 so as to cause the reverse movement of the bag carrier is as follows: This is accomplished by allowing the pawl 306 to come into engagement with the ratchet 293, said pawl being held normally out of engagement with the ratchet as already described, by the pawl stop 294. The said pawl stop 294 is of bell crank shape pivoted at 307 (see Fig. 11) having one arm which engages the pawl and another arm which engages with one arm of a cam lever 308 fulcrumed at 309 and is held in such engagement by a spring 310. The other arm of said lever 308 from that which is engaged by the lever 294 has a cam face which is adapted to be engaged by the roll 288 mounted on the periphery of the pawl carrier 254. Just before the end of the forward rotation of the said pawl carrier 254 the said roll 288 will engage the said lever 308 and turn it slightly on its fulcrum thereby releasing the pawl stop lever 294 from engagement with the pawl 306, thereby allowing the pawl 306 to engage with the ratchet 293 and allowing the pawl carrier 292 to make one revolution until the pawl 306 is tripped again by the pawl stop 294 which in the meantime will have been swung back into operative position by the spring 310.

The up-drive of the elevator has already been described as being controlled by the operator by depressing a treadle at the beginning of each cycle of movement. Mechanism is provided, however, whereby the elevator may be automatically started and driven so that there will be a continued repetition of the cycle of movements without intervention of the operator. Mechanism for doing this is as follows: See Figs. 24, 25, 30, 31 and 32. A pinion 311 is mounted fast on the continuously rotating shaft 117. A gear 312 is loosely mounted on the intermittently rotating shaft 102 and meshes with the pinion 311. A gear 313 is also mounted loose on shaft 102 and engages with a gear 314 which is loose on shaft 117. See Figs. 31 and 36. A cam 315 is made fast to one face of the gear 314. See Fig. 31. A fork 316 has a bifurcated upper portion which straddles the shaft 117 alongside of the face of the cam 315 and is formed with a cylindrical lower portion 317 which passes loosely through one arm of the lever 111 and its lower end is adapted to be engaged with the upper side of the lever 318 which is made fast to the shaft 232. A spring 319 is coiled around the stem 317 of the fork, its upper end abutting against the washer 320 which is fast on the said fork and its lower end abuts against a washer 321 which is loose on the stem of the said fork and rests on the upper side of the lever 111. A ratchet 322 is fast to the hub of the gear 312 and is loose on the shaft 102 and is adapted to be engaged by a pawl 323 which is carried by the gear 313 and when so engaged the said gear 313 will be caused to revolve and therefore to revolve the gear 314 and the cam 315. See Figs. 25 and 26. A pawl stop 324, see Fig. 30, is normally in position, held in position by a spring 325 to keep the said pawl out of engagement with the ratchet. When, however, the said pawl stop is out of engagement so that the pawl is allowed to be in engagement with the ratchet said gear 313 will revolve thereby revolving the gear 314 and the cam 315. A roll 326 is carried on the side of the fork 316 and during the rotation of the cam 315 when the high part of the cam comes into engagement with the said roll 326 the said fork 316 will be moved downward and will turn the lever 111, thereby causing the forked end 113 of said lever 111 to throw in the clutch to cause the up-drive of the elevator as previously described in connection with the operation of the treadle. A spring 319 acts as a safety device to allow a yielding movement of the said lever in case the two sets of clutch pins 118 and 119 should engage each other end to end. At the same time that the fork 316 moves down as just described its lower end by engagement with the lever 318 turns the shaft 232 and by its connections with the lever 231 operates to set the brake 220 on the pulley 216 as hereinbefore described.

The mechanism for moving the pawl stop 324 out of engagement with the pawl 323 is controlled by the movement of the bag carrier and is as follows: See Figs. 8, 28, 30, 31 and 34. Pivotally connected with one end of the pawl stop lever 324 which is fulcrumed at 327 is one end of a connecting rod 328 the other end of said connecting rod being secured to the vertical arm of the bell crank 329 which is fulcrumed at 330. Said bell crank has a horizontal arm having an aperture through which passes a vertical rod 331, see Figs. 28 and 30, the lower end of said rod 331 being pivotally connected with the lever 332 fulcrumed at 333 to the frame of the machine. See Fig. 8. A spring 334 which is coiled around the said rod 331 is seated at its lower end on a collar 335 fast to the rod 331 and its upper end presses against the under side of the bell crank 329. In the movement of the bag carrier just before the end of its period of movement one of the wings of the carrier will engage the under side of the lever 332 and thereby lift the rod 331 and turn the bell crank 329 thus actuating the connecting rod 328 toward the right as viewed in Fig. 30 thus turning the pawl stop 324 out of engagement with the pawl 323 so that the gear 313 can revolve and thereby throw in the up-drive clutch of the elevator. A collar 336 is provided on the upper end of the rod 331 to limit the movement of the bell crank 329 relative to the rod 331.

If the operator desires to throw out of connection the automatic mechanism for actuating the up-drive clutch previously described, and to operate it merely by hand, mechanism is provided for that purpose as follows: See Figs. 28 and 30. A rod 337 is slidably mounted in the frame of the machine and has mounted fast thereon a tapering spool 338. The rod 337 extends alongside of one arm of the bell crank 329. By moving the rod 337 to the right from the position shown in Fig. 28 it will bring the taper side of the spool in behind the vertical arm of the bell crank 329 which will prevent the said bell crank from being rocked when the rod 331 moves either up or down and thereby prevents the pawl stop 324 from being moved out of engagement with the pawl 323 so that the automatic mechanism is held in suspense and the up-drive clutch can then be actuated only by the treadle.

On the up stroke of the elevator after the driving clutch is disengaged there is a tendency for the elevator of its own momentum to continue its upward movement. In order to check the movement of the elevator so that it will be brought to a stop substantially as soon as the clutch is disengaged without being too abrupt a stop, which would tend to injure the machine, a dash pot is provided to bring the elevator to a gradual stop without shock. To this end a dash pot 339 is hung by a rod 340 from a stationary part of the frame above the uppermost position of the elevator having a piston 341 provided with a stem 342 which extends down through the lower end of the dash pot. See Figs. 28 and 29. Secured in a bracket in the upper end of the frame is a rod 343 which extends upward and is in alinement with the piston 342 being so adjusted that it will engage the lower end of the piston 342 shortly before the elevator reaches the upper end of its movement and the piston 342 will thereby be forced upward against the yielding pressure of the piston which thereby cushions the impact of the elevator and brings it to a gradual stop without shock. A spring 244 which is seated on the piston and whose upper end engages the upper end of the interior of the dash pot is compressed on the upward movement of the piston and is thereby put under tension so that it moves the piston down again when the upward pressure of the elevator is removed by the descent of the elevator.

Shaft 117 as already described is continuously rotating, being driven through any suitable connections with the main driving shaft 131, the mechanism shown being a chain 345 running over a sprocket 346 on shaft 131 and a sprocket 347 on shaft 117, see Figs. 2, 8 and 31.

It is important that the main hopper 1 should be provided with a shut off which can be operated at the will of the operator to open or close the passage through the chute 2 to the worm feed and the form of shut-off shown is a slide 348. In large machines the hopper and slide are at such an elevation that the workman cannot readily reach the slide from the floor and mechanism is provided connected with the slide which is down within reach of the workman. The mechanism shown is as follows: Secure to the slide 348 and forming an extension thereof is a rack 349 formed with teeth on one edge which engage with a pinion, not shown, mounted on a shaft, not shown, on which a sprocket wheel 350 is mounted. A chain 351 runs over said sprocket 350 and also runs over a sprocket 352 on a shaft 353 on which is mounted a hand wheel 354 which is within the reach of the operator so that by turning said hand wheel he can operate the rack 349 thereby moving the slide 348 to open and close the passage from the hopper at will.

There is a separate scale hopper for each pair of scales through which the material is fed to the bag while upon the scale, the hopper 355 being for the first scale and the hopper 356 being for the second scale. Each scale hopper is provided with stirring mechanism for stirring up the material to keep it loosened up and also to aid the feeding, and at the bottom of each hopper are provided shutters whereby the flow of material from the hoppers may be shut off, controlled by the tipping of the scale beam. The stirring mechanism is in many respects alike in both hoppers and operated in a good deal the same way as also are the shutters. Each hopper has two sets of stirring devices, one above the other, consisting of paddles projecting from a rotary hub, the forms of the paddles and arrangement differing somewhat in the two hoppers. The mechanism for driving these stirrers is so constructed and arranged that they will begin to rotate after the bags have been moved into proper position on the scale platforms beneath the hoppers and so constructed that the stirrers for each hopper will be stopped as soon as its respective scale beam tips.

The shutter operating mechanism is so constructed and controlled that the shutters will be closed when the scale beam tips and the stirrer mechanism stops, and will be opened after the bags are in position upon the scale platform to receive the supply.

For convenience of description the stirrer mechanism for the second scale hopper will be first described, the drawings showing the shutters open in the position that they will be in during the feed. See Figs. 40 and 41. The upper stirring mechanism for the hopper 356 consists of a series of paddles 357 radiating from a shaft 358 which is caused to intermittently rotate at the proper times while the feed is in progress and the lower stirring mechanism consists of a series of paddles 359 projecting from a hub mounted on a shaft 360. The upper stirrer shaft 358 carries a sprocket 361 which is connected by a chain 362 with a sprocket on shaft 360 whereby the shaft 358 is driven by the shaft 360. Shaft 360 in turn carries a sprocket which is connected by a chain 363 with a sprocket on shaft 364, said shaft 364 carrying a sprocket which is connected by a chain 365 with a sprocket 367 which is loose on the continuously rotating shaft 366. Clutch mechanism is provided whereby the said shaft 364 is intermittently rotated by connection with the shaft 366, the clutch being thrown into engagement at the end of the forward movement of the bag carrier and disengaged when the scale beam tips. See Fig. 37. The clutch mechanism shown consists of a pin clutch, the sprocket 367 having pins 368 projecting from one face thereof adapted to engage with pins 369 projecting from the face of a pin disk 370 which is mounted on the shaft 366 in such manner as to be slidable thereon but rotates therewith. The said pin disk 370 is actuated by means of a bell crank lever 371 fulcrumed at 372, one end of which has a fork connection with a band on the hub of the pin disk 370, the other end of said lever 371 carrying a roll 396 which is engaged by the cam disk 395 which is controlled to throw the clutch into engagement when the shutters open and to throw the clutch out of engagement when the scale beam tips and the shutters close.

The two shutters 373, 374 are operated by mechanism which is as follows, controlled by the tipping of the scale. See Fig. 38. The shutter 373 is mounted on a rocker stud 375 to which is rigidly connected a rocker arm 376 having a link connection 377 with one end of the lever 378 fulcrumed on the shaft 360. The shutter 374 is fast to a rocker shaft 379 on which is rigidly connected a rocker arm 380 having a link connection 381 with the other arm of said lever 378 on the opposite side of the fulcrum from the arm to which the link 377 is connected. When said lever 378 rocks in one direction it will close both of said shutters 373, 374 and when it rocks in the other direction it will open both of said shutters. Pivotally connected with said lever 380 is a connecting rod 393 which extends vertically upward and passes loosely through an arm 382 mounted on the bracket 383. Said rod 393 carries a clamp 384 from which projects a pin 385 which is engaged loosely by a fork in one end of a lever 386 which is fulcrumed at 387 to said bracket 383. A link 388 has one end pivotally connected with said lever 386, the other end of said lever being pivotally connected with one arm of a rocking lever 389 which is pivotally connected intermediate its ends at 390 to a fixed part of the machine. Said lever carries two steel plates 391, 392 which are adapted to be alternately engaged by a block 394 carried on the face of the cam disk 395 to rock said lever in opposite directions and thereby to actuate the rocking lever 386 through the connecting rod 388 and open and close the shutters for the hopper at the proper time. The cam disk 395 carries on one face thereof a pawl 397 which is adapted to engage with a ratchet 398 which is made fast to the continuously rotating shaft 366, and when the pawl is so engaged the said cam disk will rotate and thereby actuate the lever 389 by engagement of the block 394 with one or the other of the two plates 391, 392 carried by said cam disk 395. See Figs. 26, 27, 37 and 38.

A yoke shaped rocking lever 399 mounted on shaft 400 is of semi-circular shape, the two arms thereof carrying respectively pins 401, 402. The said lever is always in position so that one or the other of said pins 401, 402 will be in position to engage the said pawl 397, said pins being located diametrically opposite to each other so that when one of the said pins is disengaged from the pawl thereby allowing the pawl to engage with the ratchet and rotate the cam disk 395, the other pawl will be thrown into position to disengage the pawl as soon as the said cam disk has made a half revolution. An arm 403 is made fast at one end to the shaft 400, the other end of said arm being pivotally connected with the upper end of a connecting rod 404, the lower end of said connecting rod being pivotally connected with a rocker arm 405 which is mounted fast on shaft 406, said rocker shaft 406 being journaled in bearings in a bracket 407, see Figs. 46, 50 and 9. Said shaft 406 carries a finger 408 which engages a cam face on the upper arm 409 of a tripping lever 410 fulcrumed at 411. The lower end of said tripping lever 410 engages with the notched short arm of the horizontal tripping lever 412 fulcrumed at 413 to a pedestal 414 which is fast to the frame. The long arm of said lever 412 rests on the top of the post 415, the long arm overbalancing the short arm so that when free to do so it will rest on the top of said post, holding the short arm up in position to engage the vertical tripping lever 410. The scale platform 237 is mounted on one end of a scale beam 416 which is fulcrumed intermediate its ends at 417, the rear arm of said scale beam carrying the weights 418. Projecting downward from the said rear arm of the scale beam is an arm 419 whose lower end carries a hook 420 which engages with the under side of the long arm of the horizontal tripping lever 412. When the scale platform 237 drops under the weight of the bag on it the other arm of the scale beam will rise and by reason of the hook on the arm 419 the long arm of the tripping lever 412 will be lifted, thereby releasing the notched end of its other arm from engagement with the lower end of the tripping lever 410 and allow the rocker shaft 406 to turn, said rocker shaft 406 being maintained under a torsional pressure by a spring 421, one end of which is fast to a portion of the frame and the other end of which is connected with the said upright connecting rod 404 which pulls down on said rod 404 and thereby through the arm 405 tends to turn the shaft 406. See Figs. 9 and 38. This movement of the shaft 406 and of the connecting rod 404 will through the connections already described rock the yoke shaped pawl stop lever 399 in a direction to disengage the pin 401 from the pawl 397 thereby allowing the cam disk 395 to make a half revolution until the pawl is again tripped by the pin 402 and this movement of the said cam disk will cause the block 394 to engage with the plate 392 on the rocking lever 389 and thereby actuate the mechanism for closing the shutters and stopping the stirrer of the hopper 356.

As soon as the scale platform has dropped it is lifted again automatically by mechanism, which will be described, before the bag is removed so that it shall bring it back to the level of the track for the carrier to remove the bag. See Figs. 9, 44, 46 and 50. An arm 422 pivoted at one end at 423 beneath the scale beam extends along on the under side of the scale beam and is adapted to engage with the rib 424 which projects from the side of the scale beam. Said arm 422 is pivotally connected with a rod 425 which normally holds the said arm 422 down out of contact with the rib 424 so that it will not interfere with the tipping of the scale beam. The other end of said connecting rod 425 is pivotally connected with a rocker lever 426 fulcrumed at 427. On the arm of the said lever 426 opposite the end which is connected with the rod 425 rests the lower end of a pin 428 which passes loosely up through the frame of the machine, the upper end of said pin being adapted to be engaged by the horizontal arm of the bell crank lever 371. When the said cam disk 395 rotates so that the point of the cam engages the roll 396 so as to turn down said horizontal arm of the bell crank 371 it pushes down the said pin 428 and thereby turns the rocking lever 426 in a direction to lift the connecting rod 425 and thereby to lift the arm 422 and raise the platform end of the scale beam 416 and to positively hold the said scale platform in its elevated position until the said arm 422 is turned down again by the downward movement of the connecting rod 425. The high part of the cam 385 extends over a sufficient portion of the periphery of the said cam to hold the connecting rod 425 in the locking position until the said disk is actuated to begin the next half of its revolution, at which time the high part of the cam will ride off of the roll 396 and allow the bell crank lever 371 to be turned by the upward pressure of the spring 429. The weight of the connecting rod 425 will be sufficient of itself to cause it to drop and release the lock from the under side of the scale beam. After the pawl 397 has been disengaged from its ratchet at the end of each half revolution of the disk 395 there is a little tendency for the said disk to make a recoil and in order to prevent this friction a device is provided, see Fig. 38, consisting of two arms 430, pivoted at 431, having curved portions formed with friction faced shoes which engage the hub 432 of the cam disk 395. The said friction devices are held in engagement with the said hub by a spring 433.

As previously described, a latch 277 aids in controlling the movement of the bag carrying mechanism in such manner as to prevent the movement of the carrier until the said second scale platform has tipped. The mechanism by which the said latch is tripped is as follows. See Fig. 9. A connecting rod 434 has one end pivotally connected with the bell crank lever 371, the other end of said rod being pivotally connected with a lever 435, one end of which is pivotally connected with the frame of the machine, the other arm of which is pivotally connected with the rod 280 which is connected with the upper end of said latch 277. When the said bell crank 371 is turned by the tipping of the scale it pulls the said connecting rod 434 in a direction to turn the said lever 435 to act through the connecting rod 280 and release the said latch 277, whereby so far as the second scale is concerned the carrier may be allowed to move, see Fig. 9. The mechanism for tripping the latch 278 which is controlled by the tipping of the first scale is similar to the mechanism just described for tripping the latch 277 and it is directly behind the said mechanism just described for tripping the latch 277, as viewed in Fig. 9 and is therefore not shown in the drawings.

As already stated, the stirrer mechanism and shutter operating mechanism for the first scale are very similar to the mechanisms for performing the same functions in connection with the second scale and the mechanisms will be described as briefly as possible. For convenience of notation and comparison of the corresponding mechanisms the reference numerals given to the various elements connected with the first scale and scale hopper are just one hundred higher than those given to the corresponding elements of the second scale and scale hopper already described. See Figs. 42 and 43 Thus, briefly, 458 is the shaft for the upper stirrer paddles 457, and 460 is the lower stirrer shaft with paddles 459. Sprocket 461, chain 462, chain 463, shaft 464, chain 465, and sprocket 467 which is loose on the same shaft 366 which drives the stirrer and the shutter mechanism of the second scale hopper are employed in driving the corresponding parts of the first scale hopper. See Fig. 37. The shaft 464 is intermittently rotated by connection with the shaft 366, the sprocket 467 having pins which engage with pins on the disk 470. The said disk 470 is actuated by means of bell crank 471 fulcrumed at 472 and having a fork connection with a band on the hub of the pin disk 470, the other end of said lever 471 carrying a roll 496 which is engaged by the cam disk 495 which is controlled to throw the clutch into engagement when the shutters open and to throw the clutch out of engagement when the scale beam tips and the shutters close. In Figs. 42 and 43 of the drawings the shutters of the first scale hopper are shown open as in Figs. 40 and 41 of the second scale hopper. In Fig. 39 the shutters of the first scale hopper are shown closed. In Fig. 38 the shutters of the second scale hopper are shown open. In Fig. 39 which shows the first scale hopper shutter and stirring mechanism the section line is through the shaft 366 taken on such a line that the cam disk 495 and the rocking lever 389 are not shown. The shutter 473 is mounted on the rocker stud 475 connected with rocker arm 476 having link connection 477 with lever 478 fulcrumed on shaft 460. Shutter 474 is mounted on rocker shaft 479 connected with rocker arm 480 having link connection 481 with lever 478. Pivotally connected with rocker arm 478 is a connecting rod 493 which carries a clamp 484 having a pin 485 which is engaged by a lever 486. A link 488 connects said lever 486 with one arm of a rocking lever 489 carrying two steel plates 491 and 492 which are adapted to be alternately engaged by a block carried on the face of the cam disk 495 in a similar manner to the corresponding parts already described with reference to rocking lever 389 and cam disk 395 to open and close the shutters. There is also a yoke-shaped rocking lever 499 corresponding with the yoke-shaped rocking lever 399 to control the connection between the cam disk 495 and the ratchet 498. See Figs. 37 and 45. An arm 503 is made fast at one end to the shaft 500, the other end of said arm being pivotally connected with a connecting rod 504, the lower end of said connecting rod 504 being connected with a rocker arm 505 mounted on rocker shaft 506. Tripping mechanism similar to that already described with relation to the second scale as shown in Figs. 46 and 50 having the elements similar to those bearing reference characters from 407 to 422 inclusive, is provided for the said first scale. A rod 525 has suitable connections for raising the scale beam after the scale platform has dropped similar to the mechanism connected with rod 425 for raising the scale platform of the second scale.

The latch 278 which aids in controlling the movement of the bag carrying mechanism in such manner as to prevent movement of the carrier until the first scale platform has tipped is tripped by mechanism similar to mechanism which trips the latch 277. See Fig. 44. A connecting rod 534 similar to the rod 434 is connected with the bell crank lever 471 but is behind the rod 434 as shown in Fig. 9 and therefore is not seen in that figure but is shown in Fig. 44. It connects with a lever similar to the lever 435 and has a rod 281 which connects with the latch 278. See Fig. 11. This is actuated by the tipping of the first scale in a similar manner to the tripping of the latch 277 by the tipping of the second scale beam but the latches 277 and 278 are actuated entirely independently of each other, each one being actuated by the tipping of its own scale beam.

After the scale beams have both been tipped by the weight of the goods on the scale platforms it is important that the tripping lever 410 shall be reëngaged with the tripping lever 412 and the shaft 406 rocked in the reverse direction from that in which it was previously rocked when the said tripping lever was tripped and also that the shaft 506 shall be rocked in the reverse direction and the tripping mechanism connected therewith shall be re-set so as to be ready for the next weighing operation. For convenience mechanism is provided whereby the movement of the bag carrier controls this reverse movement and re-setting and it is done in such manner that this is accomplished simultaneously with both sets of mechanism by the action of one of the carrier wings. See Figs. 9, 37 and 50. Mounted fast on the rocker shaft 406 is an arm 536 which is pivotally connected with a rod 537, the upper end of said rod 537 having a loose connection with one arm of the bell crank 538 which is mounted fast on the rocker shaft 539 which is journaled in the frame of the machine, the other arm of said bell crank 538 having a pivotal connection with one end of a rod 540, the other end of said rod 540 having a pivotal connection with one arm of the bell crank 541 which is loose on a stud 542. The other arm of said bell crank 541 has a loose connection with a rod 543 similar to the connection of the bell crank 538 with the rod 537. The lower end of said rod 543 has a pivotal connection with a rocker arm 544 similar to the rocker arm 536, said rocker arm 544 being fast to the rocker shaft 506. Mounted fast on the rocker shaft 539 is an arm 545 which projects down into the path of the carrier wings so that during each period of movement of the bag carrier one of said wings will engage the said arm 545 and carry it up into a more horizontal position and thereby turn the rocker shaft 539 and bell crank 538, and thereby through the several intermediate mechanisms already described which connect said bell crank 538 with the rocker shafts 406 and 506 respectively turn said rocker shafts 406 and 506 in the reverse direction from that in which they were turned during the dropping of the scale platforms and thus the finger 408 on shaft 406 will be turned up so that it will no longer hold the vertical tripping lever 410 turned out of engaging position for the horizontal tripping lever 412 and said tripping lever 410 will be free to be turned back into engaging position with the said lever 412. A spring 546 one end of which is made fast to the frame and the other end of which is connected with the vertical tripping lever 410 was put under tension when the said tripping lever 410 was tripped at the time the scale beam was tipped and now pulls back said tripping lever 410 into its operative position. The horizontal tripping lever 412 before this will have dropped back into its position of rest on top of the post 415 and will be tipped up slightly by the swinging back of the lever 410 so as to readily permit the swinging back of said lever 410 into its position of engagement with the notch in the end of the lever 412. As an additional and safety means for insuring the resetting of said tripping lever 410 a pin 547 is provided which projects from the collar on the shaft 406 and engages the upper bent portion 409 of the lever 410 and aids in positively turning back the said lever 410 into its operative position. See Fig. 46. The corresponding reverse movement of the rocker shaft 506 operates to re-set the tripping lever connected with the first scale. The loose connection already referred to of the rod 537 with the rocking lever 538 is by a pin 548 projecting from the bell crank and passing through an elongated slot 549 in the connecting rod and the loose connection of the bell crank 541 with the connecting rod 543 is also by a pin 550 projecting from the bell crank through an elongated slot 551 in the connecting rod 543. The purpose of this loose connection is so that in the turning movement of the rocking levers 406 and 506 at the time the scale platform tips each one may independently trip without the cooperation of the other.

Mechanism is provided whereby each of the scale hoppers may be adjusted to varying positions of elevation either higher or lower to adapt them to bags of different sizes. This mechanism is the same for both scale hoppers. It is shown more clearly in Figs. 39 and 45 in connection with the first scale hopper. The hopper 355 is attached to a vertically slidable bracket 552, said bracket 552 being formed with a rack 553 which engages with a pinion 554 mounted on shaft 555. Said shaft 555 carries a hand wheel 556 whereby said shaft may be rotated to raise or lower the rack 553 and thereby raise or lower the hopper 355 as desired. The said slidable bracket is formed with side flanges having grooves 557 which are engaged by flanges 558 on the stationary bracket 559 to guide the sliding bracket 552 in its movement up or down and also to steady it. A pawl 560 pivoted to the frame of the machine is adapted to engage with said pinion 554 to hold the said rack 553 in its adjusted position. The pawl will prevent the rack from descending but will trail over the teeth to allow the said rack to be raised. When it is desired to move the rack down the pawl can simply be tripped out of engagement with the pinion by hand. The second scale hopper 356 is mounted upon a slidable bracket 561 which is operated in a manner already described with relation to the hopper 355.

The bags are transferred from the second scale platform 237 to a conveyer belt 562 which may be a continuously traveling belt running over a pulley 563 and over another pulley which is not shown, the belt being broken away in Fig. 2 as it will be readily understood without showing the other pulley or the remaining portion of the carrier belt. The shaft on which the other pulley is shown carries a sprocket from which a chain 564 runs to a sprocket 565 mounted on shaft 566. Mounted on said shaft 566 is a bevel gear 568 which engages with a bevel gear 569 on shaft 570 which is driven by a pulley 571. Any suitable driving mechanism, however, may be employed to drive the carrier belt continuously.

As previously described, means are provided to cause the retraction of the carrier wings at the end of each period of forward movement so that the bag will be left frefrom the friction of the carrier wing during the filling operation. In order that the recoil may not be too great stop mechanism is provided to limit the length of the recoil. See Fig. 20. A stop lever 572 is pivoted at 573 and normally rests in a downwardly inclined and forwardly extending position resting upon a stop pin 574 to limit the downward drop of the said stop but extending far enough down so that during the forward movement of the carrier wing it will ride under said stop 572 and engage therewith raising it so that the carrier wing can pass from under it and as soon as the carrier wing has passed by the free end of the said stop 572 the said stop will drop down again into position where its end will serve as a stop to limit the backward recoil of the carrier wing.

Sometimes when the elevator is in its uppermost position it is desired to lower the elevator without having any movement of the carrier, as for instance, if the bag which is being filled by the worm feed should burst under the pressure so that it is desired to lower the elevator for the purpose of introducing a new bag but without transferring the bags which are already on the scales. Mechanism is provided for this purpose. A stop lever 575 is mounted on a shaft 576 and is operated by a hand lever 577 in such manner that said stop lever may be turned down into engagement with the upper side of the pawl stop 257 so that said pawl stop will positively be prevented from being disengaged from the pawl 256 if the elevator descends and therefore there would be no movement of the bag carrier. It is also sometimes desired to start the bag carrier by hand without any movement of the elevator platform and mechanism is provided for this purpose. See Fig. 13. A lever 578 pivoted at 579 to a part of the frame of the machine extends beneath the pawl stop 257 and rests on top of the lever 286 to prevent its dropping down. By pressing down on the handle end 580 of said lever 578 the other arm of said lever will lift the pawl stop 257 and thereby allow the pawl 256 to engage with the rachet 255 and allow the carrier to move through one period of its movement. The pawl stop will be thrown back into operative position again before the end of the single period of movement of the carrier by the same mechanism already described by which the said pawl stop 257 is moved into operative position after having been tripped by the descent of the elevator.

By the term "bag" in this specification and in the claims is intended any suitable receptacle that is capable of use with the machine. For most purposes a receptacle of flexible material such for instance as a flour bag or meal bag is best adapted for use with the machine but it is not intended to limit the claims to the use of the machine with a receptacle of the kind which in ordinary speech is referred to as a bag.

What I claim is:

1. In a filling and weighing machine the combination of a worm feed and two weighing mechanisms, a carrier for transferring a receptacle from a position to receive material from the worm feed successively to positions on the two weighing mechanisms, means for supplying material to the receptacle at its proper station through the worm feed and means for supplying material to the receptacle while on the weighing mechanisms, means for stopping the carrier after it travels a predetermined distance equal to the distance between two stations and means for restraining the starting of the carrier until the receptacles at each of the three stations have received their respective loads.

2. In a filling machine the combination of a worm feed which delivers a portion of the load to a receptacle, two weighing scales to one of which the partially filled receptacle is delivered after receiving the partial load from the worm feed, a second scale to which the receptacle is delivered from the first scale and where it receives an additional supply, separate means for feeding the material to the receptacles while on the scales, means for starting and stopping the worm feed, means for opening and closing the scale feeds, intermittently moving carrier mechanism which delivers the receptacle from the position beneath the worm feed to the first scale and from the first scale to the second scale, means for actuating the carrier and detent mechanism which restrains the movement of the carrier until all three feeds have stopped.

3. In a filling machine the combination of a worm feed which delivers a portion of the load to a bag, two weighing scales to one of which the partially filled bag is delivered after receiving the partial load from the worm feed, a second scale to which the bag is delivered from the first scale and where it receives an additional load, separate means for feeding the material to the bags while on the scales, means for starting and stopping the worm feed, means for opening and closing the scale feeds, intermittently moving carrier mechanism which delivers the bag from the position beneath the worm feed to the first scale and from the first scale to the second scale, means for actuating the carrier, detent mechanism which restrains the movement of the carrier until all three feeds have stopped, a movable support for the bag beneath the worm feed, a bag support connected with each scale, mechanism controlled by the movement of one of the bag supports at the end of the feed movement for the bag on that support to render operative the carrier driving mechanism, and means controlled by the movement of the other bag supports at the end of the feeding operation to the bags on said supports to release the respective detents connected therewith, thereby allowing the driving mechanism controlled by the movement of said first bag support to become operative.

4. In a filling machine the combination of a worm feed which delivers a portion of the load to a receptacle, a weighing scale to which the partially filled receptacle is delivered after receiving the partial load from the worm feed, a second scale to which the receptacle is delivered from the first scale and where it receives an additional load, separate means for feeding the material to the receptacles while on the scales, means for starting and stopping the worm feed, means for opening and closing the scale feeds, intermittently moving mechanism which delivers the receptacle from the position beneath the worm feed to the first scale and from the first scale to the second scale, means for actuating the carrier, detent mechanism which restrains the movement of the carrier until all three feeds have stopped, a movable support for the receptacle beneath the worm feed, a receptacle support connected with each scale, mechanism controlled by the movement of the receptacle support for the worm feed to render operative the receptacle carrier mechanism subject to the release of the detents controlled by the weighing scales, and means controlled by the tipping of the scales to release the detents controlled by said scales.

5. In combination, a worm feed, a vertically movable platform on which the bag is supported beneath the worm feed and which is depressed by the filling of the bag through the worm feed, two scale platforms onto which the bag is carried successively from the bag support under the worm feed, means for supplying material to the bag successively while on the two scale platforms, carrier mechanism for moving the bag successively from one bag support to the other, a continuously rotating driving shaft, an intermittently rotating shaft, means whereby said intermittently rotating shaft drives the bag carrier, a clutch connection between said driving shaft and said intermittent shaft, stop mechanism which is adapted to hold said clutch disengaged, means actuated by the descent of the bag support for the worm feed to release said stop mechanism, two independent detents which tend to restrain the said stop mechanism from being released by the movement of said worm feed bag support, said detents being respectively and independently controlled by the two scale platforms and which are released respectively by the tipping of the respective scale platforms thereby allowing the said clutch stop to be released by the movement of the worm feed receptacle support.

6. In combination, a worm feed, a vertically movable platform on which the bag is supported beneath the worm feed and which is depressed by the filling of the bag through the worm feed, two scale platforms onto which the bag is carried successively from the bag support under the worm feed, means for supplying material to the bag successively while on the two scale platforms, carrier mechanism for moving the bag successively from one bag support to the other, a continuously rotating driving shaft, an intermittently rotating shaft, means whereby said intermittently rotating shaft drives the bag carrier, a clutch connection between said driving shaft and said intermittent shaft, stop mechanism which is adapted to hold said clutch disengaged, independent means controlled by the worm feed bag support and each of said scale platforms whereby said clutch mechanism is restrained from engagement until the worm feed bag support has completed its descent and each of the scale platforms is tipped.

7. In combination with a vertically movable bag support, a weighing scale, a worm feed for delivering material to the bag on said vertically movable support and thereby depressing the worm feed bag support, means for delivering the material to the bag while on the scale platform, intermittently moving means for carrying the bag from the worm feed bag support to the scale platform, means controlled by the downward movement of the worm feed bag support and the descent of the scale platform to start the bag carrier, means for stopping the movement of the carrier at the end of a predetermined length of travel, means controlled by the movement of the carrier near the end of its period of movement to start the up-drive movement of the worm feed bag support, and means controlled by the upward movement of the worm feed bag support to start the worm feed.

8. In combination with a vertically movable bag support, a weighing scale, a worm feed for delivering the material to the bag on said vertically movable support and thereby depressing the worm feed bag support, means for delivering material to the bag while on the scale platform, intermittently moving means for carrying the bag from the worm feed bag support to the scale platform, means controlled by the downward movement of the worm feed bag support and the descent of the scale platform to start the bag carrier, means for stopping the movement of the bag carrier at the end of a predetermined length of travel, means controlled by the movement of the carrier near the end of its period of movement to start the up-drive movement of the worm feed bag support, means controlled by the upward movement of the worm feed bag support to start the worm feed, and means also controlled by the bag carrier near the end of its period of movement to start the feed to the bag on the scale platform.

9. In combination with a vertically movable bag support, two weighing scales, a worm feed for delivering the material to the bag on said vertically movable support and thereby depressing the worm feed bag support, means for delivering material to bags while on the scale platforms, intermittently moving means for carrying the bags from the worm feed bag support successively to the first scale platform and then to the second scale platform, means controlled by the downward movement of the worm feed bag support and the descent of both scale platforms to start the bag carrier, means for stopping the movement of the bag carrier at the end of predetermined lengths of travel which will leave a bag on each of the scale platforms, means controlled by the movement of the carrier near the end of each period of movement to start the up-drive movement of the worm feed bag support, means controlled by the upward movement of the worm feed bag support to start the worm feed, and means also controlled by the bag carrier near the end of its period of movement to start the feed to the bags on the scale platforms.

10. In a bag filling machine, a worm feed, a vertically movable bag support below the worm feed and means for raising said bag support into position for the worm feed to enter the mouth of the bag on the support, yielding mechanism which holds said bag support in position beneath the worm feed and which yields to the downward pressure due to the packing of material into the bag by the worm feed, brake mechanism which holds the downward movement of the bag support under tension, means controlled by the downward movement of the bag support at a predetermined point in its descent to stop the worm feed, and means after the worm has stopped to release the said brake.

11. In a bag filling machine, a worm feed, a vertically movable bag support below the worm feed and means for raising said bag support into position for the worm feed to enter the mouth of the bag on the support, yielding mechanism which holds said bag support in position beneath the worm feed and which yields to the downward pressure due to the packing of material into the bag by the worm feed, brake mechanism which holds the downward movement of the bag support under tension, means controlled by the downward movement of the bag support at a predetermined point in its descent to stop the worm feed, and means controlled by the downward movement of the bag support after the worm has stopped and before the bag support has reached the bottom of its movement to release said brake.

12. In a bag filling machine, a worm feed, a vertically movable bag support below the worm feed, means for raising said bag support into position for the worm feed to enter the mouth of the bag on the support, yielding mechanism which holds said bag support in position beneath the worm feed and which yields to the downward pressure due to the packing of material into the bag by the worm feed, brake mechanism which holds the downward movement of the bag support under tension, means controlled by the downward movement of the bag support at a predetermined point in its descent to stop the worm feed, means after the worm feed has stopped to release said brake, intermittently moving bag carrying mechanism for transferring the bag from said worm feed support when the said support has completed its descent, and means controlled by the movement of said bag carrier to reset the brake.

13. In a bag filling machine, a worm feed, a vertically movable bag support below the worm feed, means for raising said bag support into position for the worm feed to enter the mouth of the bag on the support, yielding mechanism which holds said bag support in position beneath the worm feed and which yields to the downward pressure due to the packing of material into the bag by the worm feed, brake mechanism which holds the downward movement of the bag support under tension, means controlled by the downward movement of the bag support at a predetermined point in its descent to stop the worm feed, means controlled by the downward movement of the bag support after the worm feed has stopped and before the bag support has reached the bottom of its movement to release said brake, intermittently moving bag carrying mechanism for transferring the bag from said worm feed support when the said support has completed its descent, and means controlled by the movement of said bag carrier to reset the brake.

14. In a bag filling machine, a worm feed, a vertically movable bag support below the worm feed, means for raising said bag support into position for the worm feed to enter the mouth of the bag on the support, yielding mechanism which holds said bag support in position beneath the worm feed and which yields to the downward pressure due to the packing of material into the bag by the worm feed, brake mechanism which holds the downward movement of the bag support under tension, means controlled by the downward movement of the bag support at a predetermined point in its descent to stop the worm feed, means after the worm feed has stopped to release said brake, intermittently moving bag carrying mechanism for transferring the bag from said worm feed support when the said support has completed its descent, and means for automatically resetting the brake after the worm feed bag support has reached the bottom of its descent and before the worm feed is again set in motion.

15. In a bag filling machine, a worm feed, a vertically movable bag support below the worm feed, means for raising said bag support into position for the worm feed to enter the mouth of the bag on the support, yielding mechanism which holds said bag support in position beneath the worm feed and which yields to the downward pressure due to the packing of material into the bag by the worm feed, brake mechanism which holds the downward movement of the bag support under tension, means controlled by the downward movement of the bag support at a predetermined point in its descent to stop the worm feed, means controlled by the downward movement of the bag support after the worm feed has stopped and before the bag support has reached the bottom of its movement to release said brake, intermittently moving bag carrying mechanism for transferring the bag from said worm feed support when the said support has completed its descent, and means for automatically resetting the brake after the worm feed bag support has reached the bottom of its descent and before the worm feed is again set in motion.

16. In a bag filling machine, a worm feed, driven mechanism for actuating said worm feed intermittently, driving mechanism, clutch mechanism intermediate said driving mechanism and driven mechanism, means for disengaging said clutch, brake mechanism connected with said driven mechanism, means controlled by the clutch releasing mechanism to set said brake, means for supplying material to the bag at another station, a support for the bag at said second station, means for transferring a bag from the worm feed station to said second station and means controlled by the worm feed which prevents the transfer of the bag from the worm feed station until the worm feed has stopped.

17. In a bag filling machine, a worm feed, driven mechanism for actuating said worm feed intermittently, driving mechanism, clutch mechanism intermediate said driving mechanism and driven mechanism, means for disengaging said clutch, brake mechanism connected with said driven mechanism, means controlled by the clutch releasing mechanism to set said brake, means controlled by the clutch engaging mechanism to release said brake, means for supplying material to the bag at another station, a support for the bag at said second station, means for transferring a bag from the worm feed station to said second station and means controlled by the worm feed which prevents the transfer of the bag from the worm feed station to the said second station until the worm feed has stopped.

18. In a bag filling machine, a worm feed, a vertically movable bag support, means for raising said bag support into position for the worm feed to enter the mouth of the bag on the support, the bag support descending during the feeding operation, means for supplying material to the bag at another station, a support for the bag at said second station, a bag carrier for moving the bag from the said first support at the bottom of its descent and transferring it to the support at said second station, means controlled by the downward movement of the said first bag support to actuate said carrier, and means for positively locking the carrier against movement during the upward and downward movement of said first bag support.

19. In a bag filling machine, a worm feed, a vertically movable bag support, means for raising said bag support into position for the worm feed to enter the mouth of the bag on the support, the bag support descending during the feeding operation, means for supplying material to the bag at another station, a support for the bag at said second station, a bag carrier for moving the bag from the said first support at the bottom of its descent, and transferring it to the support at said second station, means controlled by the downward movement of the first bag support to actuate said carrier, means for positively locking the carrier against movement during the upward and downward movement of said first bag support, and means controlled by the downward movement of the first bag support to release said lock.

In testimony whereof I affix my signature, in presence of two witnesses.

WILLIAM A. JOPLIN.

Witnesses:
WILLIAM A. COPELAND,
ALICE H. MORRISON.